United States Patent
Kitatsuji et al.

(10) Patent No.: US 7,282,882 B2
(45) Date of Patent: Oct. 16, 2007

(54) ROBOT CONTROLLER

(75) Inventors: Hiroaki Kitatsuji, Kobe (JP); Naoyuki Matsumoto, Okayama-Ken (JP); Yoshinori Kegasa, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 11/320,611

(22) Filed: Dec. 30, 2005

(65) Prior Publication Data

US 2006/0145647 A1  Jul. 6, 2006

(30) Foreign Application Priority Data

Jan. 5, 2005 (JP) ............................. 2005-000752

(51) Int. Cl.
  *G05B 19/19* (2006.01)
(52) U.S. Cl. ................. 318/568.11; 318/567; 318/569; 901/6
(58) Field of Classification Search ........... 318/568.11, 318/567, 569, 568.2, 568.4; 414/939, 217; 700/228; 901/6, 7, 31, 36, 44, 45
See application file for complete search history.

(56) References Cited

U.S. PATENT DOCUMENTS 5,379,784 A * 1/1995 Nishi et al. .............. 134/102.3

6,472,838 B1  10/2002 Shikazono et al.

FOREIGN PATENT DOCUMENTS

| JP | A 2001-100805 | 4/2001 |
| JP | A 2001-150372 | 6/2001 |
| JP | A-2003-145462 | 5/2003 |
| KR | 2001-0031303 A | 4/2001 |

* cited by examiner

*Primary Examiner*—Karen Masih
(74) *Attorney, Agent, or Firm*—Oliff & Berridge, PLC

(57) ABSTRACT

A robot control system for simultaneously controlling multi-axial robots each of which has actuators, a standard movement part being set in each of the robots, includes: a single main controller for calculating respective movement positions of the standard moving part on a movement route along which the standard moving part is to be moved; and sub-controllers installed for each of the robots, each of the sub-controllers calculating an operation amount of each of the actuators so that the standard moving part of a corresponding robot is to be moved along the movement route, based on the movement positions of the standard moving part of the corresponding robot on the movement route, and controlling each of the actuators of the robots in accordance with the operation amount.

7 Claims, 19 Drawing Sheets

```
PROGRAM  master ()
 1  JMOVE      #lc1_0
 2  LMOVE      #lc1_1
 3  CLOSE
 4  MASTER
 5  SIGNAL  2
 6  SIGNAL  2:2
 7  MLLMOVE    #lc1_2, #lc2_2
 8  MLLMOVE    #lc1_3, #lc2_3
 9  SWAIT  1001
10  SWAIT  2:1001
11  MLC1MOVE   #lc1_4, #lc2_4
12  MLC1MOVE   #lc1_5, #lc2_5
13  MLC2MOVE   #lc1_6, #lc2_6
14  MLLMOVE    #lc1_7, #lc2_7
15  MLLMOVE    #lc1_8, #lc2_8
16  ALONE
17  OPEN
18  SWAIT  1002
19  LMOVE      #lc1_9
20  HOME
 END
```

```
PROGRAM  slave ()
 1  JMOVE      #lc2_0
 2  LMOVE      #lc2_1
 3  CLOSE
 4  SWAIT  1002
 5  SALVE
 6  ALONE
 7  OPEN
 8  SIGNAL  2
 9  LMOVE      #lc2_9
10  HOME
 END
```

FIG. 17

ROBOT CONTROLLER

CROSS REFERENCE TO RELATED APPLICATIONS

This application is based upon the prior Japanese Patent Application No. 2005-752 filed on Jan. 5, 2005, the entire contents of which are incorporated herein by reference.

BACKGROUND OF THE INVENTION

1. Field of the Invention

The present invention relates to a robot control system for simultaneously controlling a plurality of robots and a robot equipment having the same.

2. Description of the Related Art

FIG. 24 is a block diagram showing a robot equipment 1 of the first conventional art. The robot equipment 1 of the first conventional art is composed of a plurality of industrial robots 2 to 4 and a plurality of robot controllers 5 to 7 installed respectively in the robots 2 to 4 for individually controlling the robots 2 to 4. The respective robot controllers 5 to 7 are connected to each other via a communication cable 8 (for example, refer to Japanese Patent Laid-Open Publication No. 2001-150372).

In the robot equipment 1 of the first conventional art, when performing a cooperative operation by the robots 2 to 4, the robot 2 among the robots acts as a master robot and the robots 3 and 4 other than the master robot act as a slave robot. The master side robot controller 5 for the master robot transmits data relating to the movement position of the master robot 2 to the slave side robot controllers 6 and 7 for the slave robots. The slave side robot controllers 6 and 7, on the basis of the data given from the master side robot controller 5, respectively control the slave robots 3 and 4 so that the slave robots 3 and 4 perform the cooperative operation with the master robot 2.

FIG. 25 is a block diagram showing robot equipment 10 of the second conventional art. The robot equipment 10 of the second conventional art is composed of a plurality of industrial robots 2 to 4, one main controller 11, and sub-controllers 12 to 14 installed respectively in the robots 2 to 4. The sub-controllers 12 to 14 have a servo amplifier for each of a plurality of actuators installed in each robot. The sub-controllers 12 to 14 are respectively connected to the main controller 11 via a communication cable 15 (for example, refer to Japanese Patent Laid-Open Publication No. 2001-100805).

In the robot equipment 10 of the second conventional art, the main controller 11 calculates the operation amount of each actuator installed in the robots 2 to 4 and transmits the calculation results respectively to the sub-controllers 12 to 14. The sub-controllers 12 to 14, on the basis of the position control data given from the main controller 11, give predetermined power to each actuator from each servo amplifier. By doing this, the motor connected to each servo amplifier is operated, thus each robot performs a desired movement operation thereof.

In the robot equipment 1 of the first conventional art, a teach pendant is provided in each of the robot controllers 5 to 7. Therefore, it is necessary for an operator to input individually a robot control program according to the operation procedure of the corresponding robots 2 to 4 to each teach pendant. Therefore, the program input operation by the operator becomes complicated. Further, the robot control program is individually inputted to the robot controllers 5 to 7, so that when performing the cooperative operation, to calculate the movement position of each slave robot, it is necessary to obtain the movement position of the master robot. Therefore, it is necessary to form the robot controllers 5 to 7 so as to communicate each other and the constitution of the robot equipment 1 is complicated.

Further, when performing the cooperative operation by the master robot 2 and the slave robots 3 and 4, it is necessary to synchronize the robot controllers 5 to 7 with each other. In this case, the variation in the control period due accumulation of a minute difference in the operation period between the robot controllers 5 to 7 and a minute difference between the transmission period and the reception period cannot be cancelled, thus a problem arises that the robot controllers 5 to 7 cannot be kept in the synchronization state.

In the robot equipment 10 of the second conventional art, the main controller 11, on the basis of an operation plan inputted from the outside, obtains the movement position of each of the robots 2 to 4, obtains the operation amount of each servo motor corresponding to each movement position by reverse conversion, and gives it to the sub-controllers 12 to 14. The main controller 11 must perform such calculations according to the number of robots. Further, as the number of axes of each robot increases, the calculation load applied to the reverse conversion increases. Therefore, when the number of robots and the number of axes of each robot increase, the load applied to the calculation of the main controller 11 increases and when the main controller 11 is realized by using a processing circuit at a slow processing speed, the robots 2 to 4 cannot be operated smoothly.

SUMMARY OF THE INVENTION

Therefore, an object of the present invention is to provide a robot control system for operating a plurality of robots simultaneously, easily, and smoothly.

The present invention is a robot control system for simultaneously controlling a plurality of multi-axial robots, each of the robots having a plurality of actuators, a standard movement part being set in each of the robots, comprising: a single main controller configured to calculate respective movement positions of the standard moving part on a movement route along which the standard moving part is to be moved; and a plurality of sub-controllers installed for each of the robots, each of the sub-controllers being configured to calculate an operation amount of each of the actuators so that the standard moving part of a corresponding robot is to be moved along the movement route, based on the movement positions of the standard moving part of the corresponding robot on the movement route, and control each of the actuators of the robots in accordance with the operation amount.

According to the present invention, the main controller calculates respectively the movement positions on the movement route where the standard moving parts set in a plurality of robots, for example, the robot hands move respectively. The main controller gives the calculated movement positions to the corresponding sub-controllers. The respective sub-controllers, on the basis of the movement positions individually given respectively from the main controller, calculate the operation amounts of the actuators such that the standard moving parts of the robots move on the movement route. In other words, the sub-controllers respectively calculate the operation amounts of the actuators by reverse conversion on the basis of the movement positions of the robots. The sub-controllers, since the movement positions are given from the main controller sequentially in the robot moving order, sequentially control the actuators by the operation amounts calculated by reverse conversion. By doing this, the standard moving parts of the robots can be moved along a predetermined movement route.

The sub-controllers are respectively installed for each robot. Therefore, the respective sub-controllers control the actuators of the corresponding robots, so that the standard moving parts of the robots can be respectively operated individually and simultaneously.

According to the present invention stated above, the single main controller calculates the respective movement positions on the movement route where the standard moving parts of the respective robots move. Therefore, an operator or an external device to which the main controller is connected only may input the control program for each robot only to the main controller. In other words, there is no need to input respectively the control programs of the robots individually to a plurality of controllers like the first conventional art mentioned above. Therefore, it is possible to save the trouble of the input operation in the robot control program and improve the convenience. Further, an interface of the controller with the operator or external device may be only installed in the single main controller and there is no need to install an interface for each robot. By doing this, the robot control system can be miniaturized and can be formed at low cost.

Further, in a case of the cooperative control, the single main controller does not communicate with another device and on the basis of the movement position of the master robot calculated, can calculate the movement positions of the slave robots. At this time, the reverse conversion calculations are respectively performed individually by the sub-controllers corresponding to the robots, thus the control period of the robot equipment can be shortened and an actuator operation instruction can be given at minute time intervals. Therefore, the robots can be operated smoothly.

Further, according to the present invention, the sub-controllers perform individually necessary calculations for each robot. By doing this, the load on the main controller can be reduced. As the number of robots operating simultaneously or the number of axes of each robot increases, the load necessary to calculate the operation amount of each actuator on the basis of each movement position increases. In the present invention, as described above, the sub-controller installed for each robot takes partial charge of the calculation of the operation amount of the actuator for the corresponding robot.

As mentioned above, the main controller, among the processing operation, can omit the reverse conversion calculation for each robot. By doing this, even if the number of robots operating simultaneously or the number of axes of each robot increases, the calculation load on the main controller can be prevented from increasing, and the movement positions of each robot can be obtained smoothly in a short time, thus each robot can be operated stably and simultaneously.

Preferably, the main controller includes: an input-output unit configured to perform an input-output operation of a signal with an external device; an input-output control circuit configured to control the input-output operation of the signal in the input-output unit; a storage unit configured to store an operation plan for obtaining the movement positions of the standard moving part of each of the robots; and a movement route calculation circuit installed separately from the input-output control circuit, the movement route calculation circuit being configured to calculate the respective movement positions of the standard moving part of each of the robots on the movement route along which the standard moving part is to be moved, based on the operation plan.

Further, according to the present invention stated above, when a signal is given from the input-output unit, the input-output control circuit controls the input-output unit. The control for the input-output operation of the input-output unit by the input-output control circuit is not performed always but performed in a short period of time. For example, if the input-output unit includes a display part and an input part, the input-output control circuit, when judging that a display instruction of movement route information indicating the movement route is given by the input part, displays the movement route information on the display part. Further, when the input-output control circuit judges that an operation plan input instruction indicating the operation plan relating to each robot is given by the input part, it stores the operation plan given from the input part in the storage unit.

The movement route calculation circuit reads the operation plan relating each robot stored in the storage unit and on the basis of the operation plan, sequentially calculates the movement position of the standard moving part of each robot. The movement route calculation circuit gives the movement position calculated for each robot respectively to the corresponding sub-controller.

According to the present invention, the movement route calculation circuit for calculating the movement positions of the robots and the input-output control circuit for controlling the other operations are structured separately. Therefore, even if the calculation load is changed by the operation of an operator, the movement route calculation circuit can output smoothly calculation results. By doing this, a plurality of robots can be simultaneously operated smoothly.

Preferably, the main controller has a maximum connection count corresponding to a maximum number of the sub-controllers which can be connected to the main controller. When sub-controllers of the maximum connection count are connected, the main controller gives calculation results to the sub-controllers sequentially at a preset timing. When sub-controllers of smaller than the maximum connection count are connected, the main controller gives the calculation results to the sub-controllers sequentially at a same timing as the timing when the sub-controllers of the maximum connection count are connected.

Further, according to the present invention stated above, regardless of the number of sub-controllers connected to the main controller, the main controller can give the calculation results to the sub-controllers at the same timing. Therefore, even if any sub-controllers are deleted when the operation plan of each robot is decided, the timing for giving the calculation results to the residual sub-controllers from the main controller is not changed and the operation characteristics of the robots controlled by the residual sub-controllers can be prevented from changing. Similarly, even if sub-controllers are added when the operation plan of each robot is decided, the timing for giving the calculation results to the existing sub-controllers from the main controller is not changed and the operation characteristics of the robots controlled by the existing sub-controllers can be prevented from changing.

For example, when one robot among the robots fails, even if the sub-controller corresponding to the broken-down robot is separated from the main controller, the operation of the robots controlled by the residual sub-controllers can be prevented from changing. By doing this, the operation to be performed by the broken-down robot is performed temporarily by the operator, thus the reduction in the productivity can be suppressed. Further, when the broken-down robot is repaired, the sub-controller corresponding to the repaired robot is connected to the main controller, thus the operation by the robots can be resumed easily.

Preferably, the main controller includes: a storage unit configured to store an operation plan for obtaining the movement positions of the standard moving part of each of the robots; and a movement route calculation circuit configured to calculate the movement positions of the standard moving part of each of the robots on the movement route along with the standard moving part is to be moved, based on the operation plan. The operation plan includes a cooperative operation information and a linked operation relating information, the cooperative operation information indicating which is a marked robot, a master robot for performing a preset standard operation or a slave robot for operating in link motion with a corresponding master robot, the linked operation relating information indicating a linked operation relation for an operation of the corresponding master robot when the marked robot is the slave robot. The movement route calculation circuit, when calculating the movement positions on the movement route along which the standard moving part of the slave robot moves, calculates the movement positions on the movement route along which the standard moving part of the slave robot moves, based on movement positions of the corresponding master robot and the link operation relating information.

Further, according to the present invention stated above, the movement route calculation circuit, when judging that the marked robot is the master robot on the basis of the cooperative operation information, calculates the movement position of the standard moving part on the basis of the operation plan corresponding to the master robot. Further, when judging that the marked robot is the slave robot on the basis of the cooperative operation information, the movement route calculation circuit judges the master robot in accordance with which the marked slave robot is operated and on the basis of the linked operation relationship between each movement position of the master robot and the slave robot, calculates the movement positions of the standard moving part of the slave robot.

According to the present invention, the movement route calculation circuit, on the basis of the cooperative operation information and linked operation relating information, calculates the movement positions of the standard moving part of the slave robot. Therefore, the operator does not need to input each movement position of the slave robot in detail, and the labor of the operator is omitted, and the cooperative operation can be performed. Further, as described above, the operation plan of each robot is inputted to the single main controller, so that the movement route calculation circuit, without communicating with other controllers, can calculate easily the movement position of each robot.

Preferably, the main controller and the sub-controllers are arranged at positions away from each other, and a plurality of communication cables for respectively connecting the main controller and the sub-controllers are installed.

Further, according to the present invention stated above, the main controller gives the movement positions of the different robots to the corresponding sub-controllers via the communication cables. The sub-controllers, on the basis of the movement positions of the standard moving part given via the communication cables, control the actuators of the corresponding robots.

According to the present invention, by connection with the communication cables, the main controller and sub-controllers can be separated from each other. Therefore, the effect of electromagnetic noise caused by the sub-controllers on the main controller can be reduced. Further, even if a plurality of robots are arranged at positions away from each other, the sub-controllers are arranged in the neighborhood of the robots and the main controller can be arranged at an appropriate position away from the robots. By doing this, the main controller can be arranged at an easily operated position.

Further, the sub-controllers are often connected to the robots by power lines for giving power to the robots and signal lines for giving a signal to or obtaining a signal from the robots. On the other hand, the cables for connecting the main controller and sub-controllers are often signal lines not required to transfer power. In this case, the cables for connecting the sub-controllers and robots are thick, while the cables for connecting the main controller and sub-controllers are thin. According to the present invention, the sub-controllers are arranged in the neighborhood of the robots, thus the thick cables for connecting the sub-controllers and robots can be shortened and can be kept away from obstructions of the operation.

Preferably, the main controller and each of the sub-controllers are installed so as to communicate with each other using Ethernet.

Further, according to the present invention stated above, the main controller and sub-controllers communicate using Ethernet. ("Ethernet" is a registered trademark.) Further, Ethernet is a communication standard of LAN (local area network) standardized as IEEE 802.3 and ISO 8802-3 by USA Institute of Electrical and Electronic Engineers (abbreviated to IEE) and International Organization for Standardization (abbreviated to ISO).

According to the present invention, by use of Ethernet, data communication can be executed at high speed, and the effect of signal transmission variations of the robots due to a difference in the length between the communication cables can be reduced, and the cooperative control can be executed precisely. Further, by use of Ethernet, the sub-controllers can be arranged at positions away from the main controller.

The present invention is a robot equipment comprising: a robot control system mentioned above; and a plurality of robots configured to be controlled by the robot control system.

According to the present invention, as described above, by controlling the robots by the single main controller, the installation space of the control system can be made smaller, thus the installation space of the robot equipment can be reduced, and the inter-robot distances can be brought close to each other. By doing this, when the manufacturing line is formed by a plurality of robots, the manufacturing line can be shortened and the working time can be shortened. Furthermore, in the present invention, a plurality of sub-controllers installed for each robot take partial charge of the calculations required for the robots, so that the load on the main controller can be reduced, and even when the robots are operated simultaneously, the robots can be operated stably. Further, the operation plans of the respective robots may be taught to the single main controller and compared with a case that the operations of the respective robots are individually taught to a plurality of controllers, the teaching operation can be simplified and the convenience can be improved.

BRIEF DESCRIPTION OF THE DRAWINGS

FIG. 15 is a flow chart showing the initial operation of the first CPU 32 when the power source of the controller 24 is turned on.

FIG. 17 is a drawing showing an example of the cooperative operation program for performing the cooperative operation by the master robot Ra and the slave robot Rb in correspondence with each teaching point shown in FIG. 16.

DESCRIPTION OF THE PREFERRED EMBODIMENTS

Figure 1:
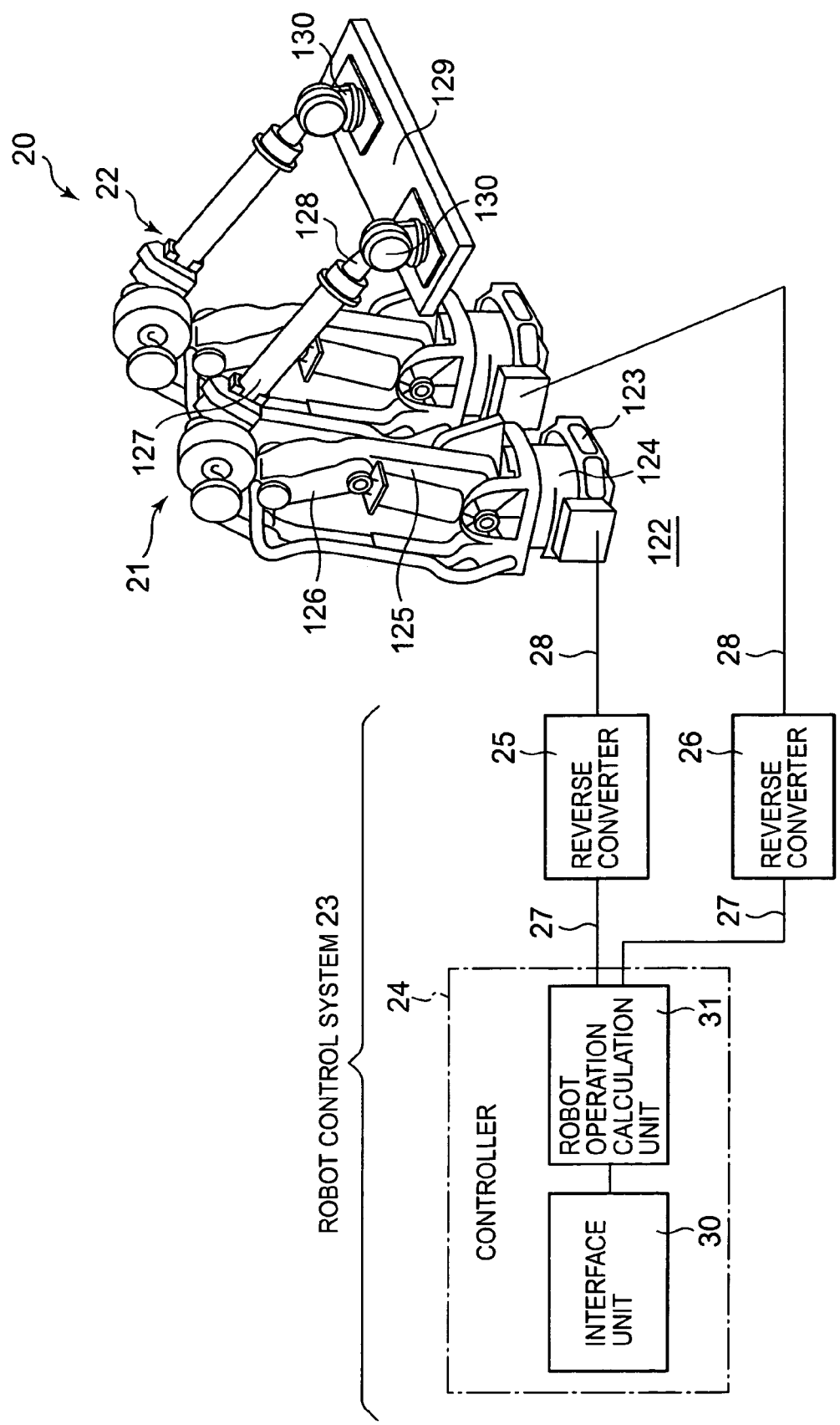
FIG. 1 is a flow diagram showing the constitution of the robot equipment 20 of the first embodiment of the present invention.
Figure 2:
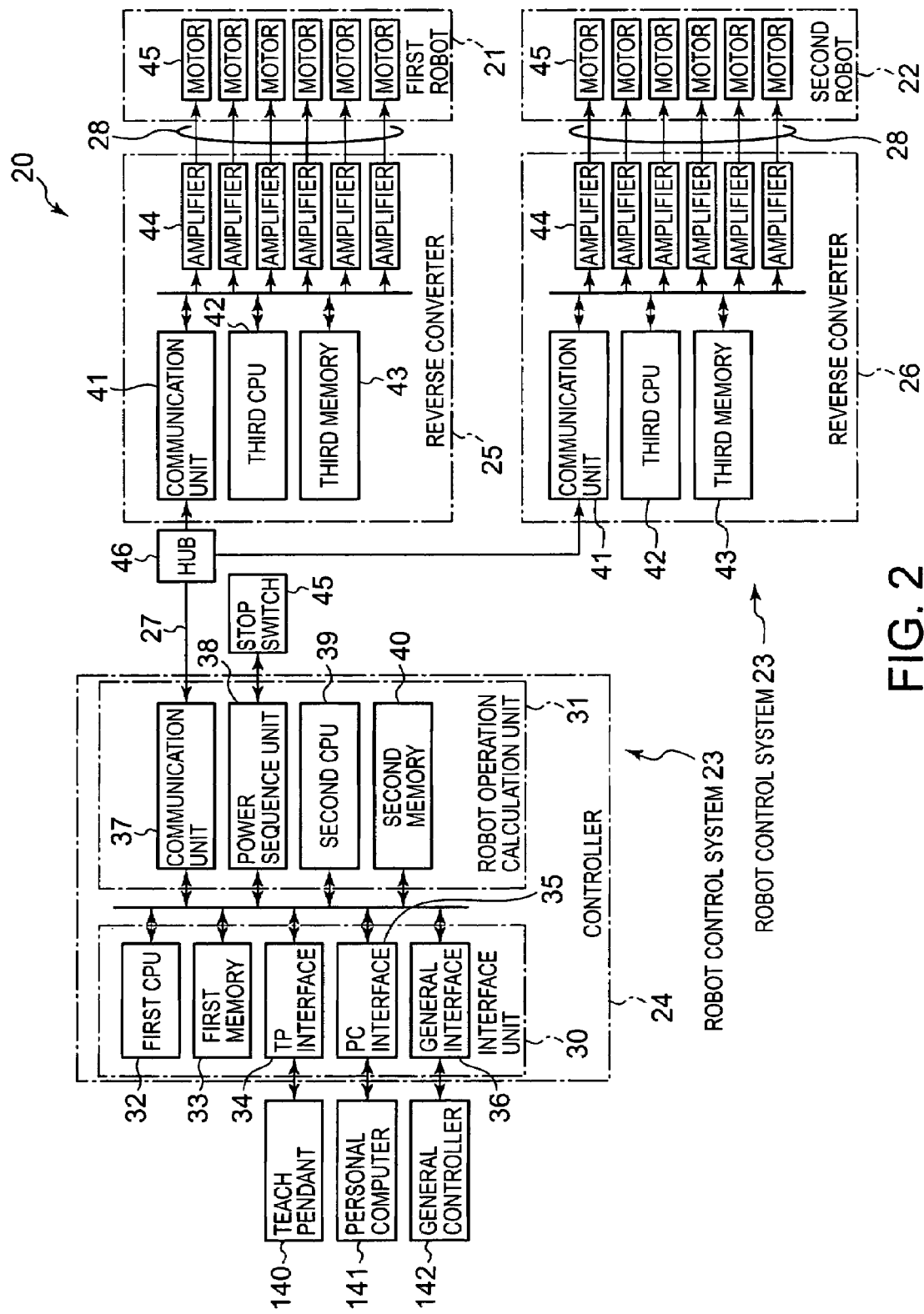
FIG. 2 is a block diagram showing the constitution of the robot equipment 20.

Referring to FIGS. 1 and 2, the robot equipment 20 of the first embodiment of the present invention is composed of a plurality of multi-axial robots 21 and 22 and a robot control system 23 for simultaneously controlling the multi-axial robots 21 and 22.

The robot equipment 20 having the robots 21 and 22 is installed on the manufacturing line and simultaneously operates the robots 21 and 22. For example, when a workpiece 129 is a heavy article or a large article, the robots 21 and 22 perform a cooperative operation, thereby by keeping the state of surely holding the workpiece 129, may convey it from a preset starting point to the arrival point. In the robot control system 23 using the robots 21 and 22, at a plurality of places according to the arrangement positions of the robots 21 and 22 in the work space, the workpiece 129 can be held, so that even if the workpiece 129 is a large article, it can be conveyed stably. Further, even if the workpiece 129 is a heavy article, the weight of the workpiece 129 is dispersed to the robots 21 and 22, so that the weight load and inertia load on the robots 21 and 22 are low and it is possible to increase the conveying speed and shorten the conveying time.

The multi-axial robots 21 and 22 of the robot equipment 20 are, for example, realized by a 6-axis vertical multi-joint robot. In the 6-axis multi-joint robots 21 and 22, on bases 123 installed mutually at an interval on a floor 122 almost parallel with a predetermined work stage, rotational bodies 124 are installed. On the rotational bodies 124, a plurality of arms 125, 126, and 127 are installed so as to change the angle round each axis. At the front end of the arm 127 on the freest end side, a wrist 128 is installed. On the wrist 128, a finger device, the so-called end effecter is installed. In this embodiment, the finger device is realized by a robot hand 130 for removably holding the workpiece 129.

In the robots 21 and 22, a servo motor 45 is installed for each rotation axis of the arms 125 to 127. The servo motors 45 are actuators for individually operating the arms 125 to 127. The respective servo motors 45 change individually the angle and drive the arms 125 to 127 to move, thus can move the robot hands 130 to an optional position and posture.

The robot control system 23 includes a single robot controller 24 (hereinafter referred to as just controller 24) and a plurality of reverse converters 25 and 26 respectively installed on the robots 21 and 22.

The controller 24 is a main controller for calculating the movement route on which the robots 21 and 22 move. Concretely, the controller 24 calculates sequentially a plurality of movement positions on the movement route along which the robot hands 130 move. The robots 21 and 22 move the robot hands 130 from the movement start position toward the movement end position. In other words, the robots 21 and 22 move sequentially the robot hands 130 to the movement positions arranged side by side along the movement route, thereby can move the robot hands 130 along the movement route. Further, the robot hands 130 are the standard moving parts set on the robots 21 and 22.

Further, the reverse converters 25 and 26 are connected to the controller 24 via communication cables 27 so as to execute data communication with it. Further, the reverse converters 25 and 26 are respectively connected to the robots 21 and 22 having a one-to-one correspondence with them. The reverse converters 25 and 26 have servo amplifiers 44 and supply power to the servo motors 45 of the robots connected by the servo amplifiers 44. The reverse converters 25 and 26 are sub-controllers for the controller 24.

The reverse converters 25 and 26 are sequentially given the movement positions of the robot hands 130 of the connected robots 21 and 22 from the controller 24. The reverse converters 25 and 26 calculate and obtain the operation amounts of the respective servo motors 45 so that the robot hands 130 of the connected robots 21 and 22 move to the movement positions and control the respective servo amplifiers 44 so as to operate by the operation amounts.

When six servo motors 45 are installed in each of the robots 21 and 22, the respective reverse converters 25 and 26 individually connected to the robots 21 and 22 control individually the amplifiers 44 for giving power to the six servo motors 45. Concretely, on the basis of the movement positions of the robot hands 130, the reverse converters 25 and 26 obtain the target angular change amounts of the servo motors 45. And, on the basis of the target angular change amounts of the servo motors 45 and the feedback values from the encoders installed in the servo motors 45, the reverse converters 25 and 26 feedback-control the amplifiers 44 for giving power to the servo motors 45.

The reverse converter 25 controls individually the amplifiers 44 for each servo motor 45. Like this, the reverse converter 25, on the basis of the movement positions of the robot hands 130, perform the revere conversion for calculating the operation amounts of the servo motors 45 and the servo process for controlling the motors 45 on the basis of the reverse conversion results.

In this embodiment, the robot equipment 20 has the first robot 21 and the second robot 22. In this case, the robot control system 23 has the first reverse converter 25 and the second reverse converter 26. The first reverse converter 25, on the basis of the movement positions of the robot hand 130 of the first robot 21 which are given from the controller 24, calculates and obtains the operation amounts of the servo motors 45 of the first robot 21 and controls the respective servo motors 45 of the first robot 21 by the operation amounts.

The second reverse converter 26, on the basis of the movement positions of the robot hand 130 of the second robot 21 which are given from the controller 24, calculates and obtains the operation amounts of the servo motors 45 of the second robot 22 and controls the respective servo motors 45 of the second robot 22 by the operation amounts.

The controller 24 and the reverse converters 25 and 26 are connected communicably connected by the communication cables 27 and compose a communication network. In this embodiment, the communication cables 27 are realized by a LAN (local area network) cable and concretely, the controller 24 and the reverse converters 25 and 26 communicate with each other using Ethernet. ("Ethernet" is a registered trademark.) As shown in FIG. 2, to the controller 24, a teach pendant 140 is connected. The teach pendant 140 is a teaching means for teaching the operation procedure of the robots to the controller 24. The teach pendant 140 has a display unit and an input unit and is connected to the controller 24 by a cable.

For example, the input unit of the teach pendant 140 is realized by a touch panel and a button. The input unit, when operated by an operator, inputs an instruction from the operator. Further, for example, the display unit is realized by a liquid crystal display device. The display unit displays the operation program of the robots and an image indicating the operation guidance of the robot control system. The cable for connecting the teach pendant 140 and controller is flexible. Therefore, the operator moves the teach pendant 140 to a desired position to the controller 24 and then can perform the teaching operation of the operation procedure of the robots. Further, the input unit and display unit aforementioned may be fixed to the controller 24.

In this embodiment, the controller 24 is connected to a personal computer 141 (hereinafter, referred to as PC 141) and is installed so as to execute data communication with the PC 141. Further, the controller 24 is connected to a general controller 142 for generally controlling the manufacturing line.

The controller 24 is equipped with an interface unit 30 and a robot operation calculation unit 31. The interface unit 30 transfers data between the controller 24 and an external device connected to the controller 24 and an operator. Concretely, the interface unit 30 is composed of a first CPU 32, a first memory 33, a TP interface 34, a PC interface 35, and a general interface 36.

The TP interface 34 gives data and an operation instruction given from the teach pendant 140 to the first CPU 32. Further, the TP interface 34 gives data and an operation instruction given from the first CPU 32 to the teach pendant 140. For example, if the input unit of the teach pendant 140 is operated by an operator, the teach pendant 140 gives data or an operation instruction according to the operation contents to the first CPU 32 via the TP interface 34.

The PC interface 35 gives data and an operation instruction given from the PC 141 to the first CPU 32. The PC 141 gives data and an operation instruction outputted by a CPU installed in the PC 141 to the first CPU 32 via the PC interface 35. Further, the PC interface 35 gives data and an operation instruction given from the first CPU 32 to the PC 141. For example, if the operator operates the input unit of the PC 32 and gives input information to the PC 32, the PC 32 gives data or an operation instruction according to the operation contents to the first CPU 32 via the PC interface 35.

The general interface 36 is connected to the general controller 142 for controlling the whole manufacturing line. The general controller 142 gives data and an operation instruction given from the general controller 142 to the first CPU 32 via the general interface 36. Further the general interface 36 gives data and an operation instruction given from the first CPU 32 to the general controller 142. For example, the general controller 142 gives a whole operation start instruction of the robot equipment 20, an operation end instruction, and an operation stop instruction to the first CPU 32 via the general interface 36. Further, the interface unit 30 may have an operation panel. The operation panel includes an input unit for inputting an operation from an operator and a display unit for displaying the operation contents to the operator.

As mentioned above, the interfaces 34 to 36 are an input-output unit for performing an input-output operation of a signal between the controller 24 and an external device and an input-output operation of information between the controller 24 and the operator. And, the first CPU 32 is an input-output control circuit for controlling the input-output operations of the interfaces 34 to 36. The first CPU 32 is realized, for example, by a central processing unit. Further, the first memory 33 stores the operation program of the first CPU 32 and stores data and calculation results given from the first CPU 32. For example, the first memory 33 is realized by an ROM (read only memory) and an RAM (random access memory).

The first CPU 32 decodes data and operation instructions given via the interfaces 34 to 36 and performs operations according to the operation instructions. For example, the first CPU 32, when a display instruction which is one of the operation instructions is given from the teach pendant 140, generates image data indicating an image to be displayed. And, the first CPU 32 gives the image data to the teach pendant 140 via the TP interface 34. The teach pendant 140, when the image data is given, displays the image indicated by the image data on the display unit.

Further, the first CPU 32, when robot relating information relating to the operation of the robots among the operation instructions and data inputted via the interfaces 34 to 36 is given, on the basis of the robot relating information, generates a robot operation plan for obtaining the movement positions of the robot hands 130 of the robots 21 and 22 and stores the robot operation plan generated in the first memory 33. The first CPU 32, on the basis of the given operation instruction, executes the program stored in the first memory 33, thereby performs the calculation for generating a robot operation plan from the operation according to the given operation instruction, for example, the robot relating information. For example, the robot relating information is given as a robot control program expressed by the robot language.

As mentioned above, the interface unit 30 makes the robot relating information inputted by the operator with the teach pendant 140 processable. Further, the interface unit 30 displays the robot relating information on the display unit of the teach pendant 140, thus the operator can confirm the robot operation plan. Therefore, the interface unit 30 serves as the so-called MMI (man machine interface). Further, the interface unit 30 processes the given robot relating information by language and calculates the robot operation plan.

The robot operation calculation unit 31 is composed of a controller communication unit 37, a power sequence unit 38, a second CPU 39, and a second memory 40. The controller communication unit 37 is installed so as to communicate with a servo communication unit 41 which will be described later. The power sequence unit 38 stores and executes an operation program set independently of the robot operation plan such as the start procedure and end procedure of each servo motor 45. For example, when the power source for the motor is turned on, the power sequence unit 38 controls the operation at the start time such as moving each robot to a preset position and then releasing the brake of the motor. Further, the power sequence unit 38 is equipped with a stop switch 45 for inputting a stop instruction for stopping or emergency-stopping the operation of each robot. When the power sequence unit 38 and the motor or servo amplifier are connected by another signal line, the motor can be surely stopped at time of emergency stop.

The second CPU 39 is given the robot operation plan from the first CPU 32 and on the basis of the robot operation plan, calculates the movement positions on the movement route where the robot hands 130 move. Namely, the second CPU 39 serves as a movement route calculation circuit. The second CPU 39 is realized, for example, by the central processing circuit. Further, the second memory 40 stores the operation program of the second CPU 39 and stores data and calculation results given from the second CPU 39. For example, the second memory 40 is realized by an ROM or an RAM.

Further, when executing the synchronous control for simultaneously controlling the robots 21 and 22 or the cooperative control, the second CPU 39, on the basis of the calculation results for the master robot 21, calculates the movement positions of the slave robot 22. Further, the constituent parts 32 to 40 in the controller 24 are connected to each other by a bus line.

The reverse converters 25 and 26 have the same constitution. Therefore, only the reverse converter 25 is explained and the explanation for the reverse converter 26 will be omitted. The reverse converter 25 is composed of a servo communication unit 41, a third CPU 42, a third memory 43, and amplifiers 44. The servo communication unit 41 is installed so as to execute data communication with the controller communication unit 37 via the communication cable 27.

The third CPU 42 is sequentially given the movement positions of the robot hands 130 from the controller communication unit 37. The third CPU 4, on the basis of the given movement positions of the robot hands 130, calculates the operation amounts of the servo motors 45 so as to move the robot hands 130 to the movement positions. In other words, the third CPU 42, on the basis of the movement positions of the robot hands 130, calculates the operation amounts of the servo motors 45 by reverse conversion. And, the third CPU 42 gives the operation amounts of the servo motors 45 to the amplifiers 44. The amplifiers 44, using the given operation amounts as a target value, control the servo motors 45 of the robot 21.

Namely, the third CPU 42 serves as an actuator control circuit. The third CPU 42 is realized, for example, by a central processing circuit. Further, the third memory 43 stores the operation program of the third CPU 42 and stores data and calculation results given from the third CPU 42. For example, the third memory 43 is realized by an ROM or an RAM.

Figure 3:
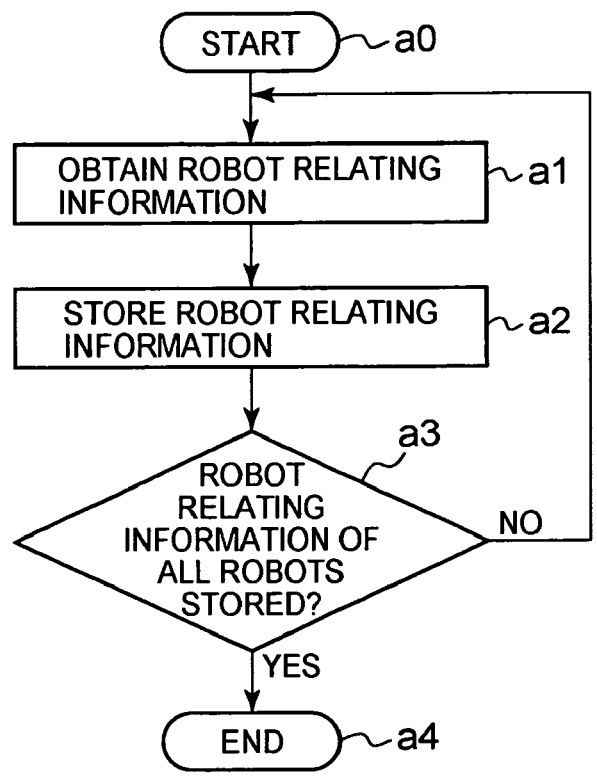
FIG. 3 is a flow chart showing the procedure of the storage operation of the robot relating information by the first CPU 32.

FIG. 3 is a flow chart showing the procedure of the storage operation of the robot relating information by the first CPU 32. The first CPU 32, as a preparation step of operating the robots 21 and 22, performs an operation of storing the robot relating information for generating a robot operation plan. For example, a case that the teach pendant 140 is used and the robot relating information of the robots 21 and 22 is inputted will be explained.

At Step a0, the first CPU 32, when the teach pendant 140 is operated and a storage instruction of the robot relating information is given, goes to Step a1 and starts the storage operation of the robot relating information.

At Step a1, the first CPU 32 is given the robot relating information for generating an operation plan from the teach pendant 140. The robot relating information is information necessary to move the robots. The robot relating information, for example, is inputted by an operator and includes the operation program expressed using the robot language. Further, it may include preset information regardless of the operation program.

The robot relating information includes, for example, information indicating a plurality of passing teaching positions through which the robot hands 130 pass, information indicating the movement route of the robot hands connecting the passing teaching positions aforementioned, information indicating the robot speed, information indicating the robot acceleration, information indicating the robot waiting time, operation information of the finger device indicating the switching operation of the robot hands 130, and robot discrimination information indicating a robot in operation. The first CPU 32, when it obtains such robot relating information, goes to Step a2.

At Step a2, the first CPU 32 stores the robot relating information obtained in the first memory 32 and goes to Step a3. At Step a3, unless an instruction indicating that the robot relating information corresponding to all the robots 21 and 22 to be operated is respectively stored is given from the TP interface 34, the first CPU 32 returns to Step a1. At Step a1, the first CPU 32 waits until the robot relating information of the robot to be operated is inputted.

At Step a3, when the instruction indicating that the robot relating information corresponding to all the robots 21 and 22 to be operated is respectively stored is given from the TP interface 34, the first CPU 32 goes to Step a4. At Step a4, the first CPU 32 finishes the storage operation of the robot relating information.

Further, in the above description, it is stated that the robot relating information is inputted to the controller 30 from the teach pendant 140. However, the robot relating information may be inputted from the PC 141 to the controller 30. Further, by the input unit installed in the controller 30, the robot relating information may be inputted directly.

The information of the passing teaching positions of the robot hands 130 may be decided on the basis of the coordinates when each robot is operated by the teach pendant 140 and reaches a desired position by moving the robot hands 130. Namely, by the teaching operation using the teach pendant 140, information of the passing teaching positions of the robot hands may be decided. Further, without performing the teaching operation, the coordinates of the passing teaching positions of the robot hands 130 may be inputted directly.

Further, when executing the cooperative control and synchronous control, the robot relating information includes cooperative operation information, master-slave discrimination information, corresponding master robot discrimination information, and linked operation relating information. The cooperative operation information is information indicating whether the marked robot performs the cooperative operation or performs an independent operation. Further, the master-slave discrimination information is information indicating whether the marked robot is a master robot for performing a standard operation or a slave robot for performing a slave operation for the master robot. Further, the corresponding master robot discrimination information, when the marked robot is a slave robot, is information indicating a master robot which is a standard for the slave robot. The linked operation relating information, when the marked robot is a slave robot, is information indicating the relationship between the operation of the slave robot and the operation of the master robot which is a standard for the slave robot. For example, the linked operation relating information is information, for the operation of the master robot, of operating the slave robot shifted by a predetermined distance in a predetermined direction.

Figure 4:
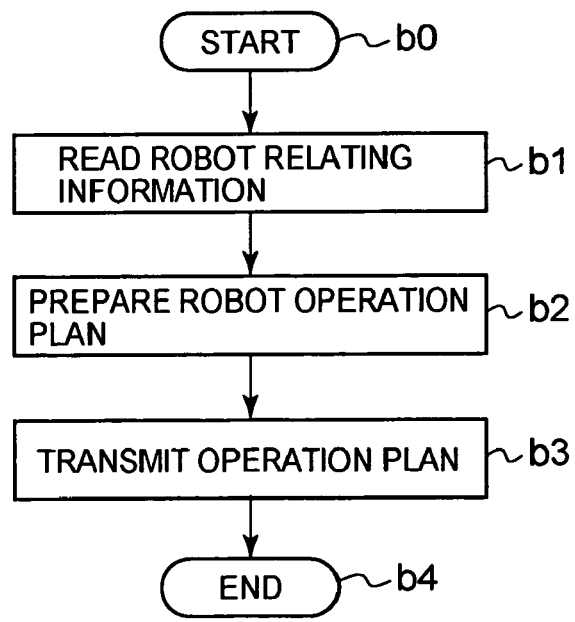
FIG. 4 is a flow chart showing the procedure of the robot operation plan generation operation by the first CPU 32.

FIG. 4 is a flow chart showing the procedure of the robot operation plan generation operation by the first CPU 32. At Step b0, the first CPU 32, when an instruction indicating the robot operation start is given when the robot relating information is stored in the first memory 33, goes to Step b1 and the first CPU 32 starts the operation plan generation operation. For example, the robot operation start instruction is given from the general controller 142 or the input unit of the controller 24.

At Step b1, the first CPU 32 reads the robot relating information from the first memory 33 for each robot and goes to Step b2. At Step b2, the first CPU 32 processes the robot relating information of each robot by language and decodes it and on the basis of the decoded robot relating information, generates a robot operation plan. The first CPU 32, when generating the robot operation plan, goes to Step b3. At Step b3, the first CPU 32 gives each operation plan generated for each robot to the second CPU 39 and goes to Step b4. At Step b4, the first CPU 32 finishes the robot operation plan generation operation.

Figure 5:
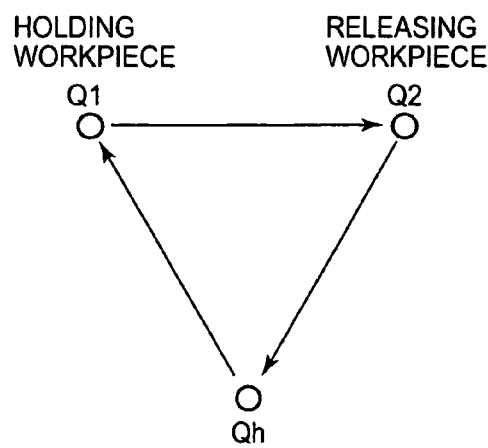
FIG. 5 is a drawing showing the movement route where the robot hand 130 of the robot operating according to the operation program shown in Table 1.
Figure 6:
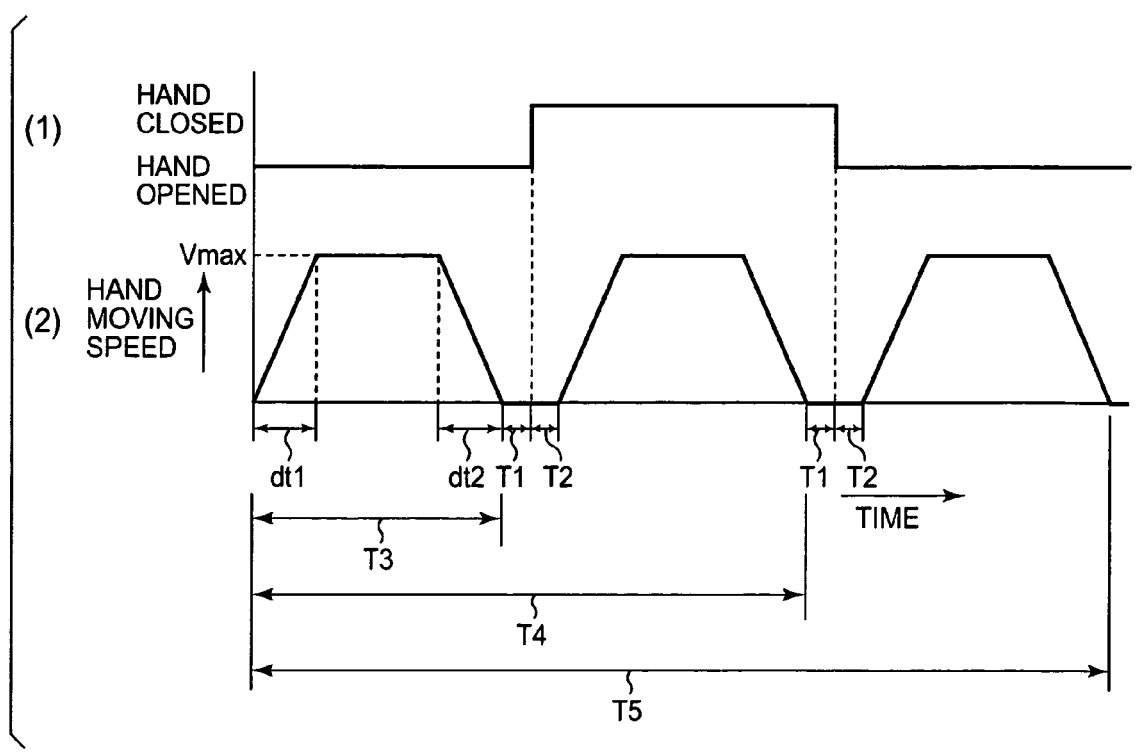
FIG. 6 is graphs showing the change with time of the moving speed of the robot hand 130 and the hand switching operation of the robot operating according to the operation program shown in Table 1.

Table 1 is a table for explaining an example of the robot operation program which is robot relating information and the commands composing the programs. FIG. 5 is a drawing showing the movement route where the robot hand 130 of the robot operating according to the operation program shown in Table 1 and FIG. 6 is graphs showing the change with time of the moving speed of the robot hand 130 and the hand switching operation of the robot operating according to the operation program shown in Table 1. FIG. 6(1) shows the change with time of the hand switching operation and FIG. 6(2) shows the change with time of the hand moving speed.

TABLE 1

| Line | Command | Explanation of command |
|---|---|---|
| 1 | JMOVE Q1 | Movement from the standby position Qh to the first operation position Q1 (interpolation movement of each axis) |
| 2 | TWAIT T1 | Waiting for T1 seconds |
| 3 | CLOSE | Hand closing operation |
| 4 | TWAIT T2 | Waiting for T2 seconds |
| 5 | LMOVE Q2 | Linear movement from the first operation position Q1 to the second operation Q2 |
| 6 | TWAIT T1 | Waiting for T1 seconds |
| 7 | OPEN | Hand opening operation |
| 8 | TWAIT T2 | Waiting for T2 seconds |
| 9 | HOME | Movement to the standby position Qh |

When the robot operates according to the robot operation program shown in Table 1, as shown in FIG. 5, the robot holds the workpiece at the first operation position Q1 from the standby position Qh, conveys it to the second operation position Q2, and returns to the standby position Qh. Concretely, when the operation program is executed, at the first step, the robot hand 130 moves from the standby position Qh to the first operation position Q1. And, as shown in FIG. 6(2), when the time reaches the preset time T3 from the operation start, the robot hand 130 moves to the first operation position Q1.

At the second step, the robot waits for the first set time T1 seconds to be preset. Next, at the third step, the robot closes the robot hand 130 and holds the workpiece arranged at the first operation position Q1. Next, at the fourth step, the robot waits for the second set time T2 seconds to be preset. Next, at the fifth step, the robot hand 130 holding the workpiece moves from the first operation position Q1 to the second operation position Q2. And, as shown in FIG. 6(2), when the time reaches the preset time T4 from the operation start, the robot hand 130 moves to the second operation position Q2.

Next, at the sixth step, the robot waits for the first set time T1 seconds to be preset. Next, at the seventh step, the robot opens the robot hand 130, releases holding of the workpiece, and arranges it at the second operation position Q2. Next, at the eighth step, the robot waits for the second set time T2 seconds to be preset. Next, at the ninth step, the robot hand 130 moves to the standby position Qh. When the time reaches the preset time T5 from the operation start, the robot hand 130 moves to the standby position Qh. The robot language expressing such an operation program composes a part of the robot relating information. For example, the operation positions Q1 and Q2 are inputted by the teaching operation as a passing teaching position. Further, the robot relating information includes acceleration information and speed information which are set in the robots.

Further, the robot operation plan calculated, as shown in FIG. 5, includes the coordinates of the operation positions Q1 and Q2 of the robot hand 130 and the order of the operation positions Q1 and Q2 to which the robot hand 130 moves, in other words, the information indicating the movement route. Further, the robot operation plan, as shown in FIG. 6(2), includes information indicating the change with time of the moving speed of the robot hand 130. Namely, at Step b2, the first CPU 32 calculates the robot operation plan which is expressed by relating a set moving speed Vmax to be preset, a maximum acceleration (Vmax/dt1) at time of acceleration, and a maximum acceleration (Vma/dt2) in the negative direction at time of deceleration to the robot operation program shown in Table 1.

Figure 7:
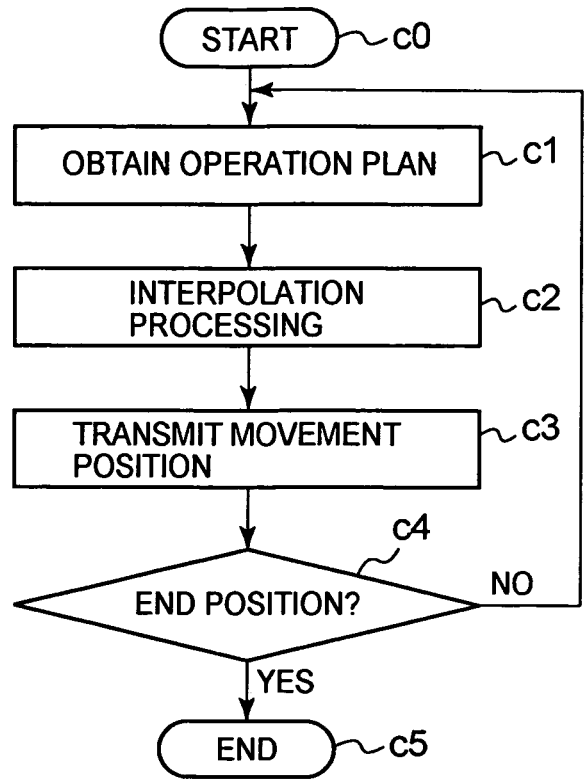
FIG. 7 is a flow chart showing the procedure of the movement position calculation operation of the robot hand 130 by the second CPU 39.

FIG. 7 is a flow chart showing the procedure of the movement position calculation operation of the robot hand 130 by the second CPU 39. At Step c0, the second CPU 39, when an instruction indicating the robot operation start is given, goes to Step c1, performs an interpolation process, and starts calculation of the movement position of the robot hand 130.

At Step c1, the second CPU 39 is given the robot operation plan for each robot from the first CPU 32. When the second CPU 39 obtains each robot operation plan like this, it goes to Step c2. At Step c2, the second CPU 39, on the basis of the robot operation plan, performs the interpolation process. Concretely, the second CPU 39, among a plurality of passing teaching positions set by the teaching operation, calculates the movement positions for interpolating the interval between two passing teaching positions arranged side by side in the movement direction. Namely, the second CPU 39 calculates the movement positions of the robot hand 130 on the movement route for each robot.

At this time, on the basis of the robot operation program aforementioned, the set moving speed to be preset, the maximum acceleration at time of acceleration, and the maximum acceleration in the negative direction at time of deceleration, the second CPU 39, when the robot hand 130 is changed at a predetermined speed, calculates sequentially the movement positions at each unit time. In other words, the second CPU 39 calculates the movement position shifted by one position downward in the movement direction from the movement position calculated previously when a preset unit time elapses for each robot hand 130. As mentioned above, when the movement position shifted by one position downward in the movement direction from the movement position calculated previously where the robot hand 130 is expected to be located after a lapse of the unit time is obtained for each robot hand, the second CPU 39 goes to Step c3. Further, when there is not the movement position calculated previously, the second CPU 39 calculates the movement position shifted by one position from the movement start position.

At Step c3, the second CPU 39, to transmit the respective movement positions calculated for each robot hand 130 to the corresponding reverse converters 25 and 26, controls the controller communication unit 37. The second CPU 39, when giving the movement positions calculated to the controller communication unit 37, goes to Step c4. The controller communication unit 37 gives the movement positions given from the second CPU 39 to the servo communication unit 41 via the communication cable 27.

At Step c4, the second CPU 39 judges whether the movement position given to the controller communication unit 37 at Step c3 is the movement end position of the robot hand 130 or not and when it is not the movement end position, returns to Step c2. At Step c2, the second CPU 39 obtains the next movement position for each robot hand.

Further, at Step c4, the second CPU 39, when judging that the movement position given to the controller communication unit 37 at Step c3 is the movement end position of the robot hand 130, goes to Step c5. At Step c5, the second CPU 39 finishes the movement position calculation operation.

As mentioned above, the second CPU 39 reads the robot operation plans relating to the robots 21 and 22 which are stored in the second memory 40 and on the basis of the robot operation plans, calculates sequentially the movement positions of the robot hands 130. Further, the first CPU 32 aforementioned controls the input-output operations of the interfaces 34 to 36. The control for the input-output operations of the interfaces 34 to 36 by the first CPU 32 is not executed always but in a short period of time.

In this embodiment, the second CPU 39 for calculating the movement positions of the robots 21 and 22 and the first CPU 32 for controlling the other operations are structured separately. By doing this, the second CPU 39 can operate only for calculations of the robot movement positions. Therefore, the controller 24, even if the calculation load is changed in a short period of time due to an operation of an operator, can smoothly output calculation results of the movement positions. Therefore, the robots can be operated stably. Namely, the robot operation is stabilized, and the program input operation and program display operation can be performed, and the convenience can be improved.

Figure 8:
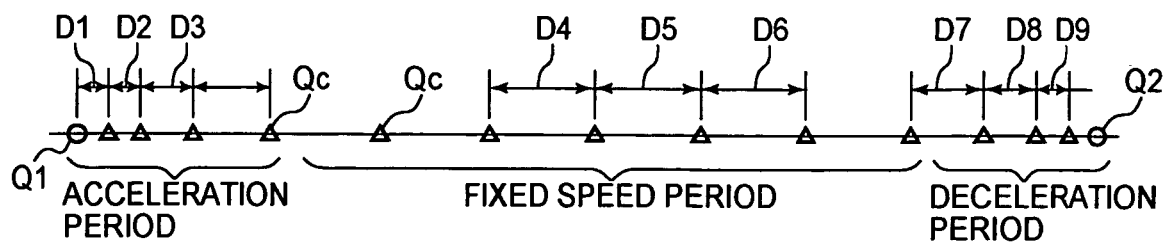
FIG. 8 is a drawing for explaining, when the robot hand 130 moves according to the operation program shown in Table 1, the two neighboring operation positions Q1 and Q2 and the movement position Qc to be interpolated.
Figure 9:
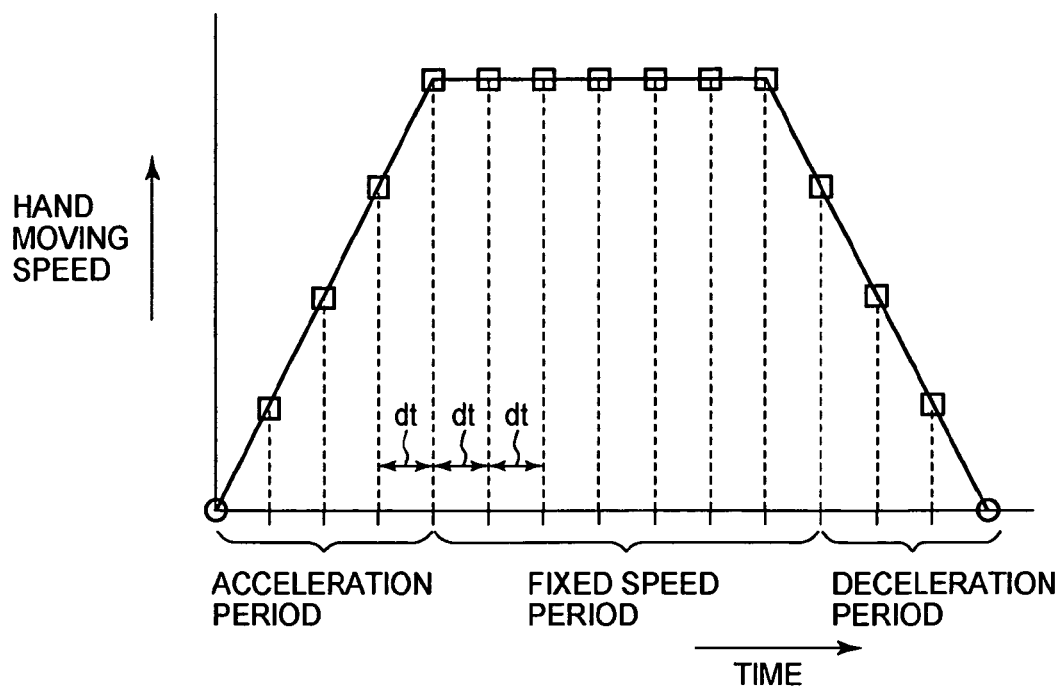
FIG. 9 is a graph showing the change with time of the moving speed of the robot hand 130 indicated to explain the movement position Qc.

FIG. 8 is a drawing for explaining, when the robot hand 130 moves in accordance with the operation program shown in Table 1, the two neighboring operation positions Q1 and Q2 and the movement position Qc to be interpolated. FIG. 9 is a graph showing the change with time of the moving speed of the robot hand 130 indicated to explain the movement position Qc. In FIG. 8, the two operation positions Q1 and Q2 are indicated by a white circle of o and each movement position interpolated is indicated by a white triangle of Δ. Further, in FIG. 9, the moving speed for each unit time of moving from one movement position to the next movement position is indicated by a white square of □.

When the robot operates, the distances D1 to D9 between the movement positions when the robot hand 130 moves for each unit time dt are changed due to acceleration and deceleration of the robot hand 130. Concretely, the distances D1 to D3 between the movement positions during the acceleration period are increased slowly toward the downstream in the movement direction. Further, the distances D7 to D9 between the movement positions during the deceleration period are decreased slowly toward the downstream in the movement direction. Further, during the fixed speed period, the distances D4 to D6 between the movement positions are fixed. For example, each movement position Qc to be interpolated, during the time from arrangement of the robot hand 130 at the operation position Q1 on the upstream side among the two operation positions to arrival at the movement position to be obtained, can be obtained by integrating the moving speed of the robot hand 130. At Step c2 aforementioned, the second CPU 39 performs the interpolation process like this in accordance with the operation plan and calculates the movement position Qc of each of the robot hands 130 at the same time.

Figure 10:
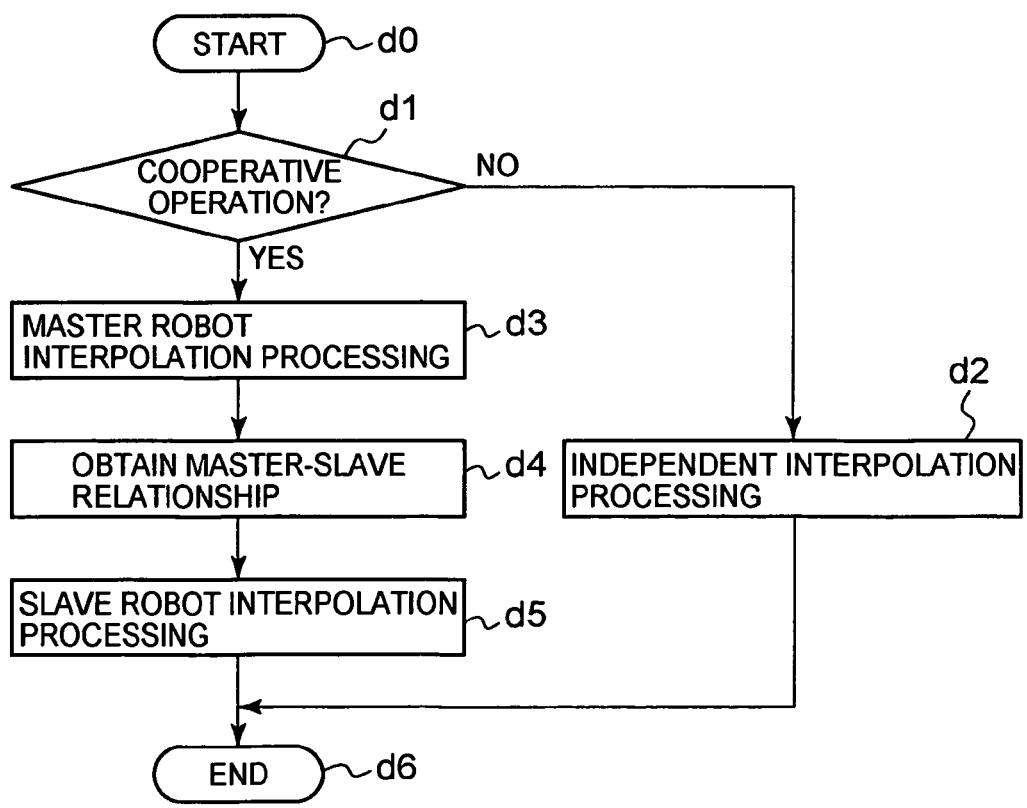
FIG. 10 is a flow chart showing the procedure of the interpolation process at Step c3.

FIG. 10 is a flow chart showing the procedure of the interpolation process at Step c3. The second CPU 39 goes to Step c3 shown in FIG. 7 and then goes to Step d1 shown in FIG. 10.

At Step d1, the second CPU 39 judges whether a cooperative operation signal for performing a cooperative operation is included in the robot operation plan or not. The second CPU 39, when it is not included, goes to Step d2. At Step d2, the second CPU 39 judges that each robot operates independently, performs the interpolation operation for each robot, and goes to Step d6. At Step d6, the second CPU 39 finishes the interpolation process.

At Step d1, when the cooperative operation signal is included in the robot operation plan, the second CPU 39 goes to Step d3. At Step d3, the second CPU 39 performs the interpolation process for the robot hand 130 of the master robot. The second CPU 39 stores the movement positions of the hand of the master robot obtained by the interpolation process and goes to Step d4. At Step d4, the second CPU 39 extracts the master-slave discrimination information, corresponding master robot discrimination information, and linked operation information from the robot operation plan and goes to Step d5.

At Step d5, the second CPU 39 extracts the movement positions of the robot hand of the master robot from the second memory 40. Further, the second CPU 39, among the robot relating information stored in the first memory 33, extracts the master-slave discrimination information, corresponding master robot discrimination information, and linked operation information. The second CPU 39, on the basis of these information, obtains the movement positions of the slave robot and goes to Step d5. At Step d6, the second CPU 39 finishes the interpolation process. By doing this, the movement positions of the master robot and slave robot at an optional time can be calculated using the single controller 24.

Figure 11:
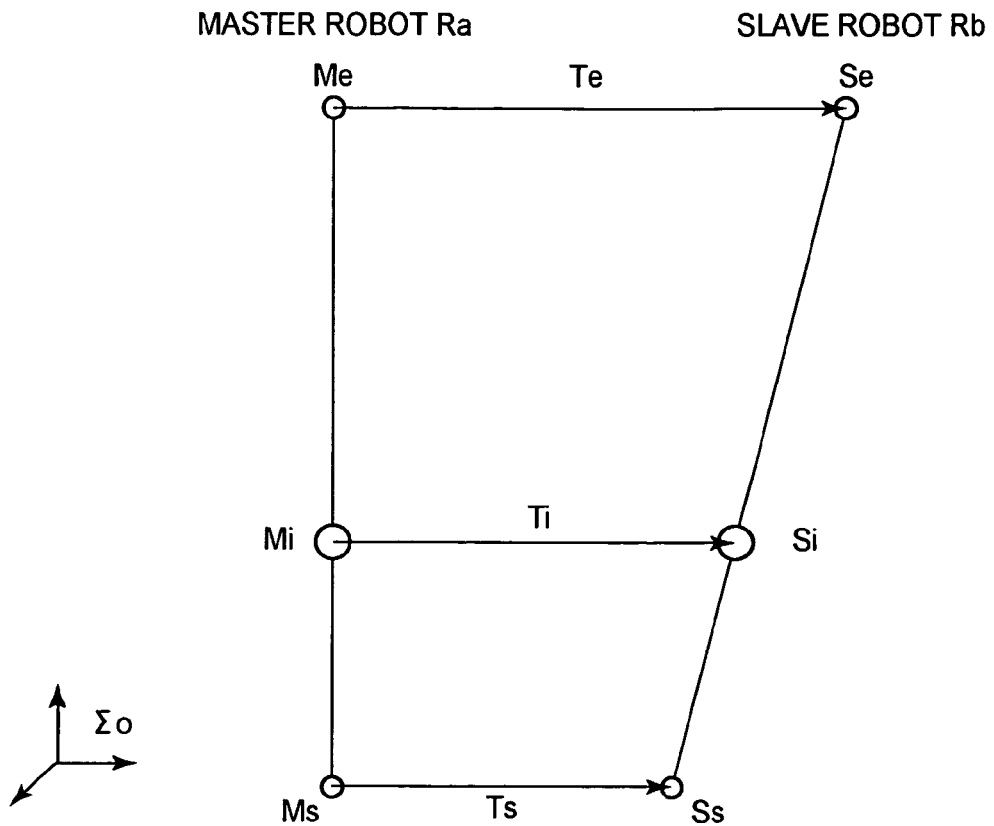
FIG. 11 is a drawing for explaining the cooperative operation of the master robot Ra and the slave robot Rb.

FIG. 11 is a drawing for explaining the cooperative operation of a master robot Ra and a slave robot Rb. The interpolation process when execution of the cooperative control is indicated in the robot operation plan assuming the first robot as the master robot Ra and the second robot 22 as the slave robot Rb will be explained below.

In a common coordinate system Σ0 of the master robot Ra and slave robot Rb, an operation start position Ms and an operation end position Me of the master robot Ra are taught. Further, in the common coordinate system Σ0, an operation start position Ss and an operation end position Se of the slave robot Rb are taught. When the master robot Ra moves from the operation teaching position Ms to the operation end position Me, the second CPU 39 obtains an operation halfway position S1 of the slave robot Rb corresponding to an operation intermediate position Mi of the master robot Ra.

The operation halfway position Mi of the master robot Ra can be obtained using a parameter of s. When the value of the parameter s=1, the master robot Ra reaches the operation start position Ms and when s=0, the master robot Ra reaches the operation end position Me. Further, the parameter s when the master robot Ra is at the operation halfway position Mi is indicated by si and the operation halfway position of the slave robot Rb at this time is assumed as Si. A conversion matrix from the operation start position Ms of the master robot Ra to the operation start position Ss of the slave robot Rb is assumed as $T_{AB}$ (s), and a conversion matrix from the operation end position Me of the master robot Ra to the operation end position Se of the slave robot Rb is assumed as $T_{AB}$ (e), and they are expressed by the following formula.

$$T_{AB}(s) = Ss.Ms^{-1} \quad (1)$$

$$T_{AB}(e) = Se.Me^{-1} \quad (2)$$

Further, when expressing the conversion matrixes $T_{AB}$ (S) and $T_{AB}$ (e) aforementioned by an XYZ Euler angle, assuming $T_{AB}$ (s) as (Xs, Ys, Zs, Os, As, Ts) and $T_{AB}$ (e) as (Xe, Ye, Ze, Oe, Ae, Te), Euler angle expressions of a conversion matrix T1 for the operation halfway position Mi of the master robot Ra can be obtained by the following formulas.

$$Xi = Xe - (Xe - Xs).s \quad (3)$$

$$Yi = Ye - (Ye - Ys).s \quad (4)$$

$$Zi = Ze - (Ze - Zs).s \quad (5)$$

$$Oi = Oe - (Oe - Os).s \quad (6)$$

$$Ai = Ae - (Ae - As).s \quad (7)$$

$$Ti = Te - (Te - Ts).s \quad (8)$$

These Formulas 1 to 8 are expressed as a conversion matrix Ti and the operation halfway position Si of the slave robot Rb for the operation halfway position Mi of the master robot Rb is obtained by the following formula.

$$Si = Ti.Mi \quad (9)$$

Such a relational expression of the operation halfway position Si of the slave robot Rb for the operation halfway position Mi of the master robot Ra is stored in the first memory 33 or the second memory 40 as robot relating information and among the robots 21 and 22, the master robot and slave robot are set optionally and the cooperative operation can be performed by them. Further, the conversion matrix $T_{AB}$ for converting the base coordinate system for the origin of one robot to the base coordinates of another robot is stored beforehand in the first memory 33 or the second memory 40.

Figure 12:
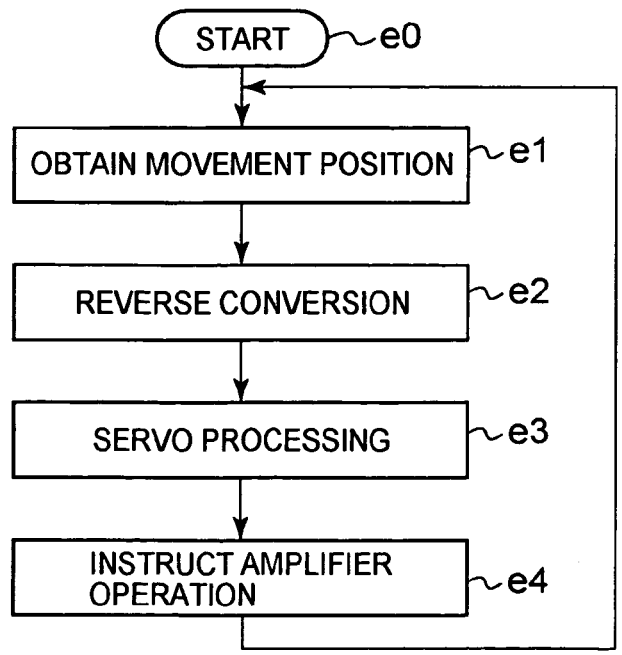
FIG. 12 is a flow chart showing the procedure of the motor control operation by the third CPU 42.

FIG. 12 is a flow chart showing the procedure of the motor control operation by the third CPU 42. At Step e0, the third CPU 42, when an instruction indicating the robot operation start is given, goes to Step e1 and starts a motor control operation of performing the reverse conversion and the servo process of the motors 45.

At Step e1, the third CPU 42 is given information indicating the movement positions of the corresponding robot from the second CPU 39. When the third CPU 42 obtains the robot movement positions like this, it goes to Step e2. The movement positions of the robot hand 130 is expressed, for example, by a simultaneous conversion matrix expressing the position and posture of the robot hand 130.

At Step e2, the third CPU 42, on the basis of the movement positions obtained, calculates the reverse conversion, that is, obtains robot arm joint angles so as to move the robot hands 130 to the target position and posture. In other words, the third CPU 42 calculates the operation instruction amount of the servo motors 45 for changing the arm angle. This reverse conversion calculation can be realized by the known procedure. At Step e2, the third CPU 42, on the basis of the movement positions of the robot hands 130, calculates the operation instruction amount of each servo motor 45 and then goes to Step e3.

At Step e3, the third CPU 42, from the operation instruction amount of each servo motor 45 calculated at Step e2, calculates the operation amount of each amplifier 44. Concretely, the third CPU 42 obtains the operation position of each servo motor 45 from an encoder installed in each servo motor 45 and from the operation position and operation instruction amount of each servo motor 45, feeds back and obtains the operation amount of each amplifier 44. Therefore, at Step e3, the third CPU 42 performs the servo process. The third CPU 42 performs the servo process and calculates the operation amount of each amplifier 44 and then goes to Step e4.

At Step e4, the third CPU 42 individually gives the respective operation amounts calculated to the corresponding amplifiers 44 and returns to Step e1. At Step e1, the third CPU 42 obtains the movement position of the robot hand which is given next. In this way, the third CPU 42 sequentially repeats Steps e1 to e4.

Each amplifier 44, when the amplifier operation amount is given from the third CPU 42, gives power in accordance with the operation amount to the corresponding servo motor 45. By doing this, each servo motor 45 moves the arm to the joint angle calculated at Step e1. Therefore, the robot hands can be moved to the movement positions. Each third CPU 42 calculates the operation amount of the amplifier 44 of the corresponding robot. The third CPU 42, since the movement positions according to the movement route are sequentially given from the second CPU 40, moves the robot hands 130 along the movement route. Therefore, the third CPU 42 of the first reverse conversion unit 25 calculates the operation amount of the first robot 21 and the third CPU 42 of the second reverse conversion unit 26 calculates the operation amount of the second robot 22.

Further, when each amplifier 44 has the servo processing function, the third CPU 42 performs the operation at Step e2, gives the operation instruction amount of each servo motor 45 to each amplifier 44, and may repeat the operations at Steps e1 and e2. In this case, each amplifier 44, on the basis of the operation amount of each servo motor 45 given from the third CPU 42 and the encoder value from each encoder, calculates the operation amount of each amplifier 44 and gives the power of the operation amount to the corresponding servo motor 45.

The robot equipment 1 is structured so as to respond flexibly even if the number of robots to be connected is increased or decreased. Concretely, even if the number of robots to be connected is increased or decreased, the output timing of calculation results outputted from the second CPU 39 and third CPU 42 for the robots connected already is kept fixed. By doing this, regardless of increase or decrease in the number of robots, the robot operation characteristics, for example, the speed, movement tracks, and cycle time can be kept fixed.

In the robot equipment 1, the maximum number of connectable robots is decided beforehand and for example, in this embodiment, eight robots are installed connectable. In this case, the second CPU 39, when the operation plan is given from the first CPU 32, calculates sequentially the movement positions to each of the eight robots and gives sequentially the calculated movement positions to each third CPU 42. Among the eight connectable robots, when only two robots are connected, the second CPU 39 calculates the movement positions of two robots and at the same timing as that when eight robots are connected, gives the movement positions of two robots to each third CPU 42.

In other words, the controller 24, when the maximum connection count of connectable robots is set in the reverse converter 26 and the reverse converter 26 of the maximum connection count is connected, sequentially gives the calculation results by the second CPU 39 to the reverse converter 26 at preset timing. Further, when the reverse converter 26 of smaller than the maximum connection count is connected, the controller 24 sequentially gives the calculation results by the second CPU 39 to the reverse converter 26 at the same timing as that when the reverse converter 26 of the maximum connection count is connected.

By doing this, the timing for respectively giving the calculation results to each third CPU 42 from the second CPU 39 can be made similar regardless of the number of robots of the reverse converter 26 connected to the controller 24. Therefore, even if the reverse converter 26 is deleted when the operation plan of each robot is decided, the timing for giving the calculation results to the third CPU 42 of the residual reverse converter 26 from the controller 24 is not changed and the operation characteristics of each robot controlled by the third CPU 42 of the residual reverse converter 26 can be prevented from changing. Similarly, even if the reverse converter 26 is added when the operation plan of each robot is decided, the timing for giving the calculation results to the third CPU 42 of the existing reverse converter 26 from the controller 24 is not changed and the operation characteristics of each robot controlled by the third CPU 42 of the existing reverse converter 26 can be prevented from changing.

Even if the number of robots is increased according to this, the timing of the operation instruction given to the amplifiers 44 of the robots connected already is not different and the speed and movement positions of the robots connected already are prevented from changing. Similarly, even if the number of robots is decreased, the timing of the operation instruction given to the amplifiers 44 of the residual robots is not different and the speed and movement positions of the residual robots are prevented from changing.

For example, when one of a plurality of robots fails, even if the reverse converter 26 corresponding to the broken-down robot is separated from the controller 24, the operation of the robots controlled by the third CPU 42 of the residual reverse converter 26 can be prevented from changing. By doing this, the operation to be performed by the broken-down robot can be performed temporarily by an operator and the productivity can be prevented from lowering. Further, when the broken-down robot is repaired, the reverse converter 26 corresponding to the repaired robot is connected to the controller 24, thus the operation by the robots can be resumed easily.

Figure 13:
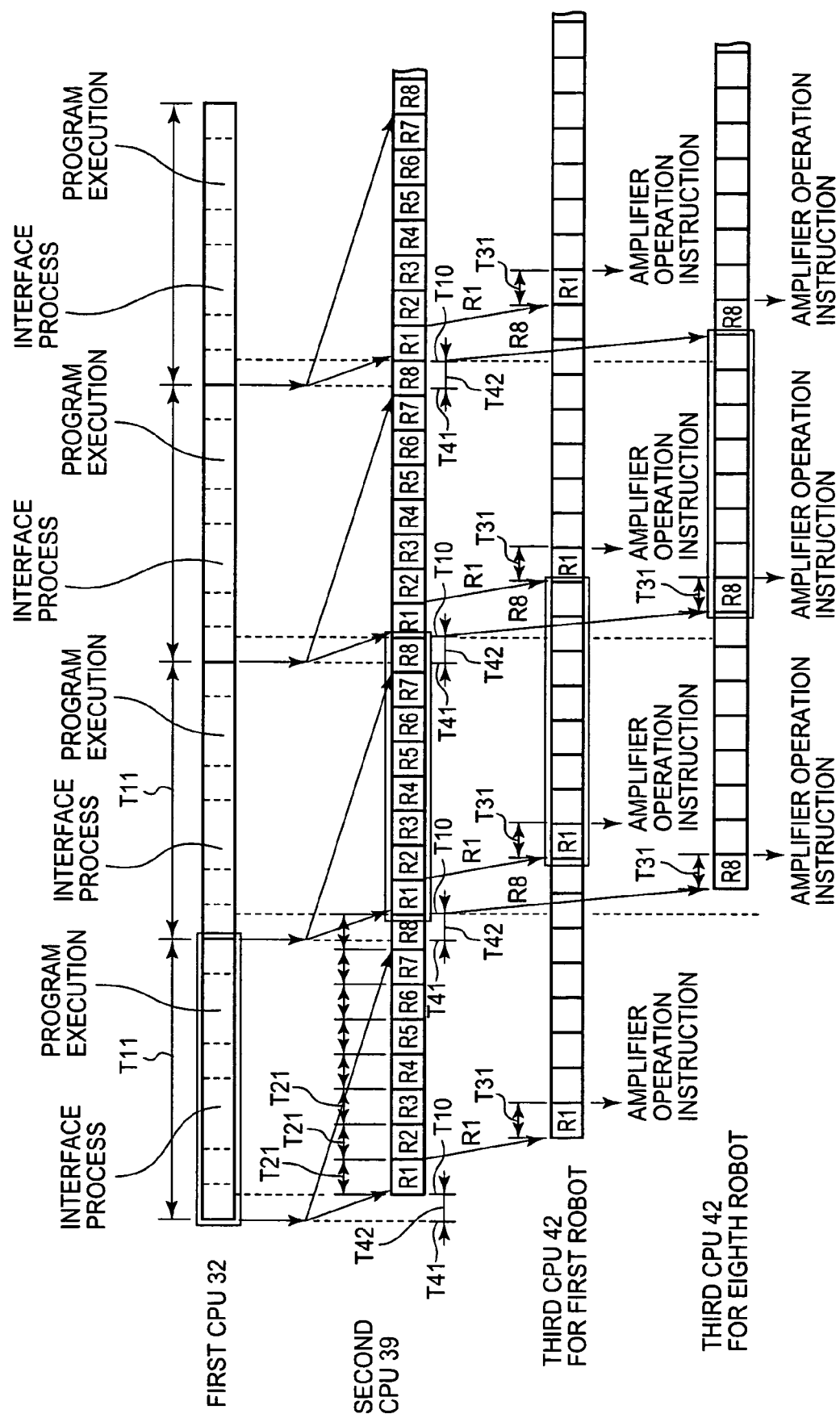
FIG. 13 is a timing chart showing the communication timing of each of the CPUs 32, 39, and 42.

FIG. 13 is a timing chart showing the communication timing of each of the CPUs 32, 39, and 42. The first CPU 32, for each preset operation plan transmission time T11, gives together the operation plans of the respective robots to the second CPU 39. The second CPU 39, on the basis of the given operation plan, calculates sequentially the movement positions of the respective robots. When there are eight robots installed, the second CPU 39 sequentially calculates the movement positions from the first robot R1 to the eighth robot R8. The second CPU 39, when calculating the robot movement positions, gives the calculated movement position to the corresponding third CPU 42 every calculation.

Namely, whenever a preset movement position transmission time T21 elapses after a movement position calculation start time T10 for receiving an operation plan from the first CPU 32 and starting the calculation of the movement positions, the second CPU 39 transmits the robot movement positions to the third CPU 42. The movement position transmission time T21 is set in the calculation time required to calculate the movement positions of one robot. The second CPU 39 transmits the movement position of the "n"th robot after a lapse of (n×T21) hours from the movement position calculation start time T10. Here, a symbol n indicates a natural number and T21 indicates a movement position transmission time. For example, the movement position of the 8th robot R8 is transmitted after a lapse of (8×T21) hours from the movement position calculation start time T10. In this way, the second CPU 39 transmits periodically the movement position.

When the first and eighth robots R1 and R8 are connected to the controller 24 and the second to seventh robots R2 to R7 are not connected to the controller 24, the second CPU 32 does not calculate and transmit the movement positions of the second to seventh robots R2 to R7, though the timing for transmitting the movement positions of the first and eighth robots R1 and R8 is the same as that when the second to seventh robots R2 to R7 are connected. Therefore, the second CPU 32 transmits the movement position of the eighth robot R8 after a lapse of (8×T21) hours from the movement position calculation start time T10.

Each third CPU 42 given the movement positions from the second CPU 39 performs reverse conversion calculations on the basis of the movement positions, obtains each robot arm joint angle, and gives the amplifier operation amount so as to change the arm to the angle to each amplifier as an amplifier operation instruction. For example, assuming the time required for the third CPU 42 to start the reverse conversion calculation and to give the amplifier operation instruction to the amplifiers as an amplifier operation instruction transmission time T31, a value of (T21×m) obtained multiplying the movement position transmission time T21 by the number m of connectable robots is set to the amplifier operation instruction transmission time T31 or less. In this embodiment, the movement position transmission time T2 is set so as to be equal to the amplifier operation instruction transmission time 31.

By doing this, the second CPU 39 can transmit the respective movement positions to be moved to the third CPUs 42 corresponding to the respective robots at intervals of the time (8×T21) obtained by multiplying by the number 8 of controllable robots. On the other hand, when one CPU executes the movement position calculation and reverse conversion calculation, at intervals of a time of (8×(T20+T30)) obtained by multiplying the sum (T20+T30) of the time T20 required for robot movement position calculations and the T30 required for robot reverse conversion calculations by the number 8 of controllable robots, the robots are moved.

As mentioned above, in the embodiment of the present invention, regardless of the time T30 required for the reverse conversion, the movement positions to be moved are transmitted and the robots can perform the cooperative operation. Therefore, even if the reverse conversion calculation is complicated, the amplifier operation instruction can be given at minute time intervals and the robots can smoothly perform the cooperative operation.

The third CPU 42 may shift the timing for operating the amplifiers. For example, when the first robot R1 and the eighth robot R8 perform the cooperative operation, the third CPU 42 of the first robot, when the time (8×T21) lapses after transmission at the amplifier operation instruction transmission time T31, operates the amplifier and the third CPU 42 of the eighth robot operates the amplifier immediately after transmission at the amplifier operation instruction transmission time T31. By doing this, the first robot R1 and the eighth robot R8 can be operated at the same time. Therefore, in the cooperative operation of the robots, each operation can be prevented more from variations.

Further, the second CPU 39, when starting the movement position calculation before receiving the operation plan from the first CPU 32, may be unable to calculate the movement positions. To prevent it, in this embodiment, the time T10 for starting the movement position calculation by the second CPU 39 is delayed from the time 41 for giving the operation plan to the second CPU 39 from the first CPU 32 by a preset delay time of T42. By doing this, even if there is a minute variation in the control period between the first CPU 32 and the second CPU 39, the second CPU 39 can calculate surely the movement positions.

Figure 14:
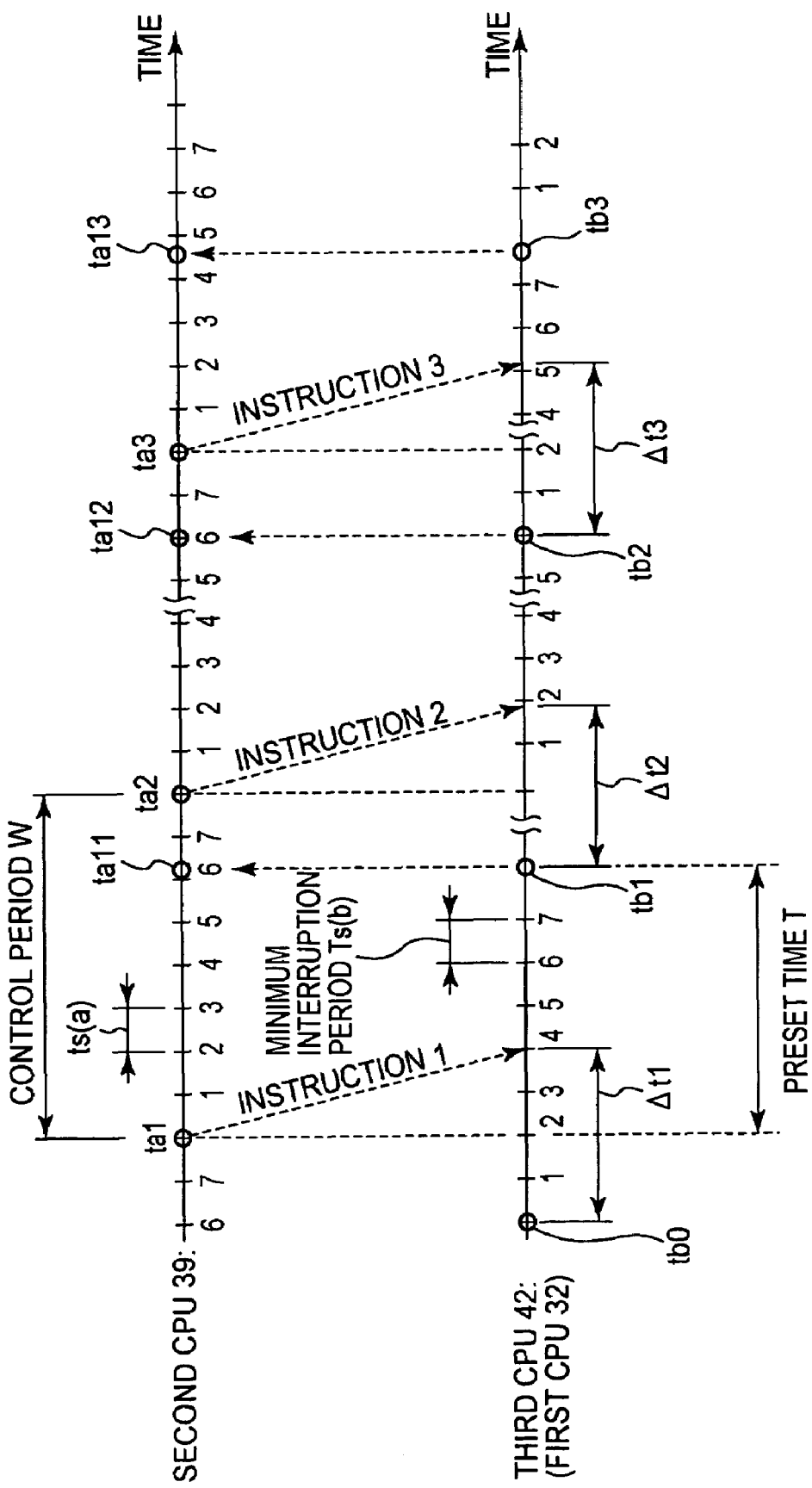
FIG. 14 is a drawing for explaining the synchronous processing function of each of the CPUs 32, 39, and 42.

In this embodiment, each CPU has a synchronous function for canceling variations in the control period and a communication delay. Therefore, the robots can perform more precisely the cooperative operation. FIG. 14 is a drawing for explaining the synchronous processing function of each of the CPUs 32, 39, and 42. The CPUs 32, 39, and 42, as described above, have a synchronous processing function for canceling variations in the control period. In this case, the second CPU 39 is set as a device on the master side and the first CPU 32 and the third CPU 42 are set as a device on the slave side.

The second CPU 39, so that a communication delay time (tb−ta) from the time ta for transmitting an operation instruction to the time tb for receiving the operation instruction by the third CPU 42 or the first CPU 32 and starting the calculation coincides with a preset time T, changes a minimum interruption period Ts (b) of the second CPU 39, thus the second CPU 39 and the third CPU 42 synchronize with each other and the second CPU 39 and the first CPU 32 synchronize with each other. Hereinafter, the operations of the second CPU 39 and the third CPU 42 will be explained concretely and the operations of the second CPU 39 and the first CPU 32 will be omitted.

Instruction signals transmitted from the second CPU 39 at each time of ta1, ta2, ta3, - - - in a predetermined control period of W are received in time series at each time of (tb0+Δt1), (tb1+Δt2), (tb2+Δt3), - - - after each predetermined time Δt1, Δt2, Δt3, - - - lapses from each control time tb0, tb1, tb2, - - - of the third CPU 42.

In such transmission of the operation instruction from the second CPU 39 to the third CPU 42, there are a first communication delay time of each reception time (tb0+Δt1), (tb1+Δt2), (tb2+Δt3), - - - from each transmission time ta1, ta2, ta3, - - - caused by a minute error in the oscillation frequency due to an individual difference between the crystal oscillators built in the CPUs 39 and 42 and a second communication delay time caused by a communication delay time due to via a cable and by a time lag from reception of each operation instruction 1, 2, 3, - - - from the second CPU 39 by the third CPU 42 at each reception time (tb0+Δt1), (tb1+Δt2), (tb2+Δt3), - - - to each control time ta1, ta2, ta3, - - - for starting the control, so that for the calculation operation instructions by the second CPU 39, minute variations occur in the calculation operation by the third CPU 42.

With respect to the first communication delay time aforementioned, in FIG. 14, when the second CPU 39 transmits the instruction 1 at the transmission time ta1, the transmitted instruction 1 is received by the third CPU 42 at the reception time (tb0+Δt1). The reception time (tb0+Δt1) is the time when the predetermined time Δt1 elapses from the preceding control time tb0 to be controlled by the third CPU 42 and the second CPU 39 receives the minimum interruption period Ts (b) of the third CPU 42 at the oscillation time of a timing signal at the fourth count.

Next, at the time ta2 after one control period elapses, the second CPU 39 transmits the instruction 2, and the instruction 2 is received by the third CPU 42 at the next reception time (tb1+Δt2). However, as mentioned above, in the crystal oscillator built in the third CPU 42, there is a minute error in the oscillation frequency due to an individual difference from the crystal oscillator built in the second CPU 39, so that the instruction 2 arriving between the first count and the second count of the minimum interruption period Ts (b) is received at the time (tb1+Δt2) at the second count from the preceding control time tb1. When the instruction 2 is received like this when the timing signal is generated before the third count from the preceding control time tb1, the third CPU 42 shortens its own minimum interruption period Tb (b) and controls the reception time (tb1+Δt2) so as to be set within a preset count range, for example, from the third count to the fifth count.

Further, the instruction 3 transmitted by the second CPU 39 at the time ta3 reaches the third CPU 42 between the fifth count and the sixth count from the preceding control time tb2, so that it is received at the sixth count and the third CPU 42 controls it at the control time tb3. Therefore, the third CPU 42 prolongs its own minimum interruption period Ts (b) and controls the reception time (tb2+Δt3) so as to be set within a count range from the third count to the fifth count from the preceding control time tb2.

By doing this, by the third CPU 42, each time (tb1−ta0), (tb2−ta1), (tb3−ta2), - - - from each time ta1, ta2, ta3, - - - for transmitting each instruction 1, 2, 3, - - - from the second CPU 39 to each time tb1, tb2, tb3, - - - for receiving it by the third CPU 42 and starting to control its own robot Ra by the third CPU 42 is prevented from exceeding the control period W of the third CPU 42. By doing this, the third CPU 42 surely prevents a fault from occurring that the third CPU 42 receives a plurality of operation instructions from the second CPU 39 within one control period W of the third CPU 42 or does not receive operation instructions within one control period W and the second CPU 39 and the third CPU 42 can be synchronized with each other with high precision.

Furthermore, to perfectly synchronize the second CPU 39 with the third CPU 42, it is necessary to cancel the first communication delay due to via a cable and the second communication delay time caused by a time lag from reception of each operation instruction 1, 2, 3, - - - from the second CPU 39 by the third CPU 42 at each reception time (tb0+Δt1), (tb1+Δt2), (tb2+Δt3), - - - to each control time ta1, ta2, ta3, - - - for starting the control for the slave robot Rb.

Therefore, to cancel the first communication delay, assuming n times (for example, n=8) of the minimum interruption period Ts (b) of the third CPU 42, which is controlled as mentioned above, as equivalent to the control period W aforementioned, it is necessary to coincide each control time ta11, ta12, ta13, - - - of the second CPU 39 with each control time tb1, tb2, tb3, - - - of the third CPU 42. Therefore, the second CPU 39 retards each control time ta11, ta12, ta13, - - - from each transmission time ta1, ta2, ta3, - - - by a preset time of T. By performing the synchronous operation like this, the second CPU 39 and the third CPU 42 can be synchronized. Similarly, the first CPU 32 and the second CPU 39 can be synchronized. Further, when the second CPU 39 is assumed as a device on the master side and the first CPU 32 and the third CPU 42 are assumed as devices on the slave side, the first CPU 32 and the third CPU 42 can be cooperatively controlled more independently of each other and can be synchronized more precisely than a case that the first CPU 32 and the third CPU 42 are assumed as devices on the master side.

The robot control system 23 in this embodiment includes a case that a plurality of robots for processing a workpiece moving along the conveying line are controlled by one controller 24. For example, when each robot is a welding robot, among the robots connected to one controller, one robot may fail. In such a case, it is possible to remove the broken-down robot from the conveying line, process the workpiece by the residual robots, and manually process the workpiece after passing the conveying line by an operator in place of the broken-down robot.

In the robot control system 23 in this embodiment, even if one of the connected robots is removed, as mentioned above, the timing for transmitting an instruction to each third CPU 42 from the second CPU 39 is set similarly, so that the operation characteristics of the residual robots can be maintained. In such a case, the robot control system 23 performs an initial operation for confirming the robots which are connected when the power source is turned on.

Figure 15:
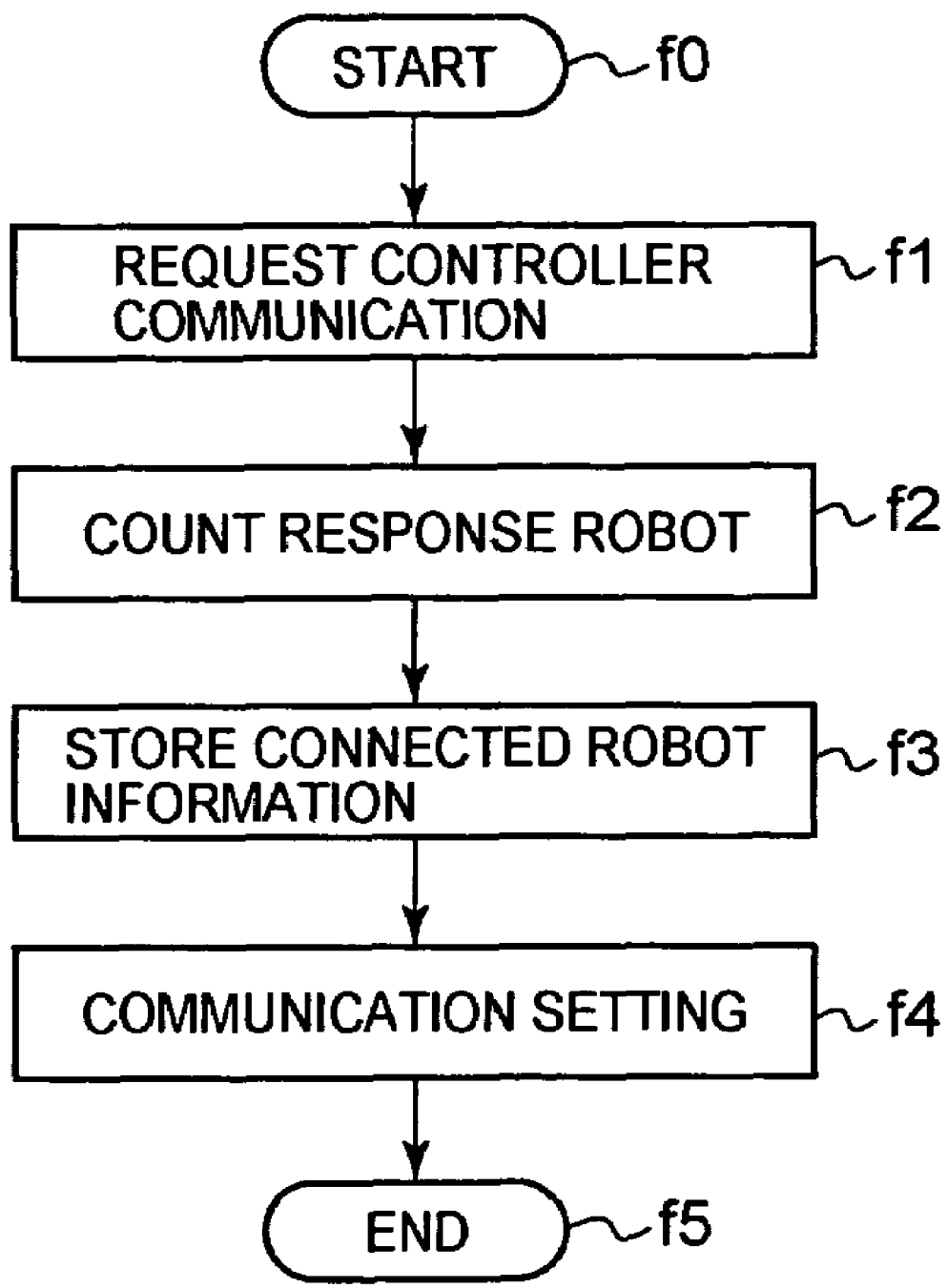

FIG. 15 is a flow chart showing the initial operation of the first CPU 32 when the power source of the controller 24 is turned on. The first CPU 32, when the power source of the robot control system 23 is turned on, goes to Step f1 and starts the initial operation. At Step f1, the robots 21 and 22, the reverse converters 25 and 26 corresponding to the respective robots, and the controller 24 are started. The controller 24, to confirm the connected robots, transmits a communication request signal to the robots 21 and 22 via the reverse converters 25 and 26 and goes to Step f2. The robots 21 and 22 receiving the communication request signal transmit a reply signal to the controller 24.

At Step f2, the first CPU 32 counts the connected robots 21 and 22 and goes to Step f3. At Step f3, the first CPU 32 judges the connected robots 21 and 22 and the robots released from connection and stores the information of those robots. At Step f4, the first CPU 32 sets calculations of the movement positions of the unconnected robots and a communication setting for stopping transmission to the reverse converter corresponding to it and goes to Step f5. At Step f5, the first CPU 32 finishes the initial operation. After end of the initial operation, the first CPU 32, in accordance with the communication setting set at Step f4, controls the connected robots. By doing this, even if the number of robots is reduced due to faults, the residual robots can perform the same operation as that before connection without newly changing the program. As mentioned above, according to the robot equipment 20 of the first embodiment of the present invention, the controller 24 calculates respectively the movement positions of the robot hands 130 set in the robots 21 and 22 on the movement route. Concretely, the controller 24 obtains the movement position which is an interpolation point between two passing teaching positions. The reverse converters 25 and 26, on the basis of a matrix expressing the movement positions given from the controller 24, perform the reverse conversion and calculate the operation amount of each servo motor 45. The reverse converters 25 and 26 control the servo motors 45 in accordance with the calculation results, thus the robot hands 130 of the robots 21 and 22 can move individually and simultaneously along the movement route set in the operation program.

The reverse converters 25 and 26 perform calculations necessary individually for each robot and take partial charge of the reverse conversion necessary for the robots 21 and 22. Therefore, even if the number of robots 21 and 22 for performing the simultaneous operation or the number of axes of each of the robots 21 and 22 is increased, the calculation load applied on the controller 24 is prevented from increasing, and the movement positions of the robots 21 and 22 can be obtained smoothly in a short time, and furthermore the robots 21 and 22 can be operated stably and simultaneously. Further, the sampling period of the second CPU can be shortened, and the interpolation positions between the teaching positions can be increased, and furthermore the robots can be moved smoothly.

The controller 24 gives the movement positions to be moved in each unit time to the reverse converters 25 and 26. Therefore, as compared with a case that a controller is provided for each robot like the first conventional art aforementioned, variations in each operation in the cooperative operation of the robots are prevented from accumulation and the cooperative operation can be performed precisely. Further, the robots 21 and 22, on the basis of an instruction given from one controller 24, perform respectively different operations, so that variations in the response time between the robots can be reduced.

Further, the single controller 24 calculates the respective movement positions on the movement route where the robot hands 130 of the robots 21 and 22 move. Therefore, an operator may only teach the operation relating information of each robot to one controller 24. Therefore, there is no need to teach individually the operation of each robot to a plurality of controllers like the first conventional art, and the teaching work can be simplified, and the convenience can be improved.

Further, the single controller 24 inputs the control program relating to all the robots 21 and 22. Therefore, the controller 24, without communicating with another device, can calculate the movement positions of the robot hands 130. Therefore, when cooperative-controlling a plurality of robots, the controller 24, on the basis of each movement position of the master robot Ra calculated by itself, can calculate each movement position of the slave robot Rb. Therefore, variations in the cooperative operation of the robots caused by communication can be prevented.

Further, the interfaces 34 and 35 may be only installed on the single controller 24 and there is no need to install the interfaces 34 and 35 for each robot. Therefore, the robot control system 23 can be miniaturized and can be formed at low cost.

Furthermore, in this embodiment, regardless of the number of robots 21 and 22, the single controller 24 may be only used, so that the installation area of the robot control system 23 is reduced and space saving can be realized. The installation space of the robot control system 23 is made smaller like this, thus the installation space in the robot equipment 20 can be reduced and the inter-robot distance can be brought close to each other. Therefore, when a manufacturing line is formed by a plurality of robots 21 and 22, the manufacturing line can be shortened and the operation time can be shortened. Further, even if the number of robots to be connected is increased or decreased, the operation characteristics of the robots connected already can be maintained, so that the robot equipment can flexibly respond to changes in the manufacturing line. Furthermore, the control periods of the CPUs 32, 39, and 42 are structured so as to be synchronized with each other, so that the synchronous control and cooperative control of each robot can be executed precisely.

Further, in this embodiment, the second CPU 39, when judging on the basis of the cooperative operation information included in the robot operation plan that the marked robot is the slave robot Rb, judges the master robot Ra in accordance with which the marked slave robot Rb is operated. And, the second CPU 39 extracts the movement positions of the master robot Ra from the second memory 40 and extracts the linked operation relationship of the slave robot Rb from the robot operation plan. And, the second CPU 39, on the basis of the movement positions of the master robot Ra and the linked operation relationship between the master robot Ra and the slave robot Rb, calculates the movement positions of the robot hand 130 of the slave robot Rb.

Therefore, the operator does not need to input each movement position of the slave robot 130 in detail, and the labor of the operator is omitted, and the cooperative operation can be performed.

Further, according to this embodiment, the controller 24 gives the movement positions of the robot hands 130 of the different robots 21 and 22 to the corresponding reverse converters 25 and 26 via the communication cable 27. The reverse converters 25 and 26, on the basis of the movement positions of the robot hands 130 given via the communication cable 27, control a plurality of servo motors 45 of the corresponding robots.

As mentioned above, by connection by the communication cable, the controller 24 and the reverse converters 25 and 26 can be separated from each other. Therefore, the effect of electromagnetic noise caused by the reverse converters 25 and 26 on the controller 24 can be reduced. Further, even if the robots 21 and 22 are arranged at positions away from each other, the reverse converters 25 and 26 are arranged in the neighborhood of the robots 21 and 22 and the controller 24 can be arranged at an appropriate position away from the robots 25 and 26. By doing this, the controller 24 can be arranged at an easily operated position.

Further, the reverse converters 25 and 26 are connected to the robots 21 and 22 by power lines for giving power to the robots 21 and 22 and the cables 28 including the signal lines for giving a signal to or obtaining a signal from the robots 21 and 22. On the other hand, the cables 27 for connecting the controller 24 and the reverse converters 25 and 26 are often signal lines not required to transfer power.

In this case, the cables 28 for connecting the reverse converters 25 and 26 and the robots 21 and 22 are thick, while the cables 27 for connecting the controller 24 and the reverse converters 25 and 26 are thin. The reverse converters 25 and 26 are arranged in the neighborhood of the robots 21 and 22, thus the thick cables 28 for connecting the reverse converters 25 and 26 and the robots 21 and 22 can be shortened and can be kept away from obstructions of the operation.

Further, for the cables for connecting the controller 24 and the reverse converters 25 and 26, LAN cables standardized according to Ethernet (registered trademark) are used. Therefore, data communication can be executed at high speed at a long distance and the effect of signal transmission variations of the robots due to a difference in the length between the communication cables can be reduced, and the cooperative control can be executed precisely. Furthermore, by use of the LAN cables, even if the controller 24 is arranged at a long distance from the reverse converters 25 and 26, a sufficient signal transfer speed can be kept.

Further, the second CPU 39, on the basis of each movement position on the movement route where the robot hand of each robot moves, may judge existence of interference between the robots when the robots are in operation. In this embodiment, to the single controller 24, the robot relating information of each robot is given, and the controller 24 calculates the movement positions of each robot, so that the controller 24 can easily judge without communicating with another device whether the robots interfere with each other. By doing this, even if the robots are not operated actually, the controller 24 can judge existence of interference of the robots and the convenience can be improved.

Figure 16:
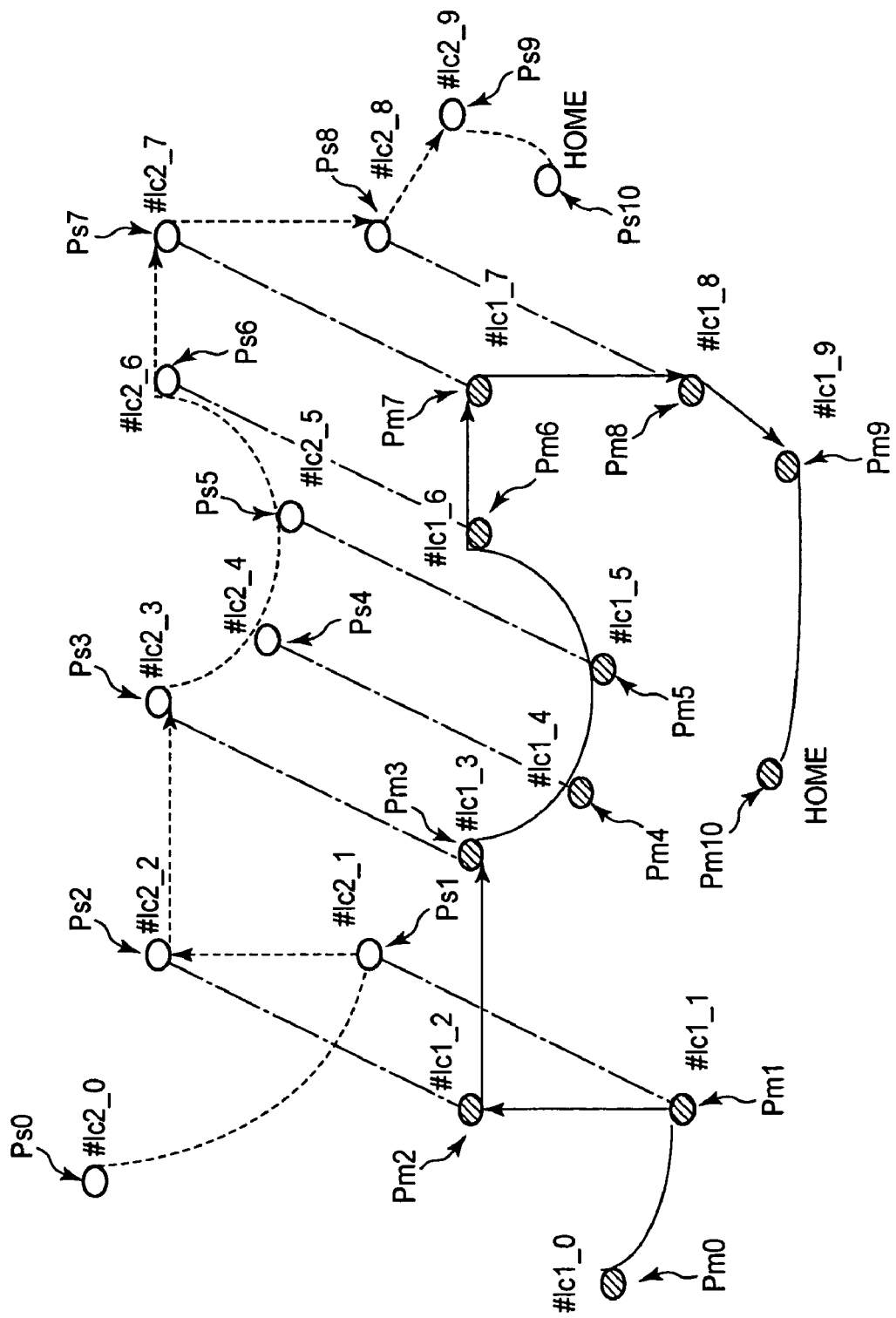
FIG. 16 is a perspective view showing the movement route of the arm front ends 94a and 94b of the robots Ra and Rb for explaining the teaching procedure of the cooperative operation points.

FIG. 16 is a perspective view showing the movement route of arm front ends 94a and 94b of the robots Ra and Rb for explaining the teaching procedure of the cooperative operation points. In the drawing, the solid lines indicate the movement route of the arm front end 94a of the master robot Ra and the dashed lines indicate the movement route of the arm front end 94b of the slave robot Rb. FIG. 17 is a drawing showing an example of the cooperative operation program for execution of the cooperative operation by the master robot Ra and the slave robot Rb in correspondence with the teaching positions shown in FIG. 16.

When preparing the program for each cooperative operation and teaching the positions, for the program, a program of ".PROGRAM master( )" executed by the robot Ra and a program of ".PROGRAM slave( )" executed by the robot Rb are prepared.

The program ".PROGRAM master( )" set on the side of the robot Ra is composed of 20 steps and is structured as indicated below so as to execute the operations from a target operation position Pm0 to an operation end position Pa10 via target positions Pm1 to Pm9, which are indicated by the solid lines in FIG. 16, by the robot Ra.

Firstly, Step 1 is an operation command for moving the axes of the robot Ra to the operation start position Pm0, which is inputted as "JMOVE #1c1#0". "JMOVE" indicates a command for moving the robot to the designated target position in the interpolation operation for the axes. "#1c1#0" indicates a variable name for instructing the target operation position Pm0.

Step 2 is a command for moving the robot Ra from the operation start position Pm0 to the next target position Pm1, which is inputted as "JMOVE #1c1#1". "LMOVE" indicates a reserved word for instructing a linear operation and "#1c1#1" indicates a variable name for instructing the target position Pm1.

Step 3 is a command for closing the hand 30 at the position Pm1 designated at Step 2, which is described as "CLOSE". The aforementioned is an independent operation program of the master robot Ra.

Next, Step 4 is a command for declaring the cooperative operation, which is described as "MASTER". By this command, the robot Ra is set as a master robot, and the robot Rb is set as a slave robot, and the cooperative operation is started. In this embodiment, to the single controller, the programs of the master robot and slave robot are inputted respectively, so that the second CPU 39 can calculate easily the movement positions of the slave robot.

Step 5 is a command for closing the hand 30 of the master robot Ra, which is described as "SIGNAL 2".

Step 6 is a command for closing the hand 30 of the slave robot Rb, which is described as "SIGNAL 2:2".

Step 7 is a command for moving the robots Ra and Rb to the next target positions Pm2 and Ps2 by performing the cooperative operation, which is described as "MLLMOVE #1c2#2,#1c2#2".

Step 8 is a command for moving the robots Ra and Rb to the next target positions Pm3 and Ps3, which is described as "MLLMOVE #1c1#3,#1c2#3".

Step 9 is a command for making the master robot Ra wait until the next instruction is satisfied, which is described as "SWAIT 1001".

Step 10 is a command for making the slave robot Rb wait until the next instruction is inputted to an input-output circuit 48b, which is described as "SWAIT 2:1001".

Step 11 is a command for moving the robots Ra and Rb to the next target positions Pm4 and Ps4, which is described as "MLC1MOVE #1c1#4,#1c2#4".

Step 12 is a command for moving the robots Ra and Rb to the next target positions Pm5 and Ps5, which is described as "MLC1MOVE #1c1#5,#1c2#5".

Step 13 is a command for moving the robots Ra and Rb to the next target positions Pm6 and Ps6, which is described as "MLC2MOVE #1c1#6,#1c2#6".

Step 14 is a command for moving the robots Ra and Rb to the next target positions Pm7 and Ps7, which is described as "MLLMOVE #1c1#7,#1c2#7".

Step 15 is a command for moving the robots Ra and Rb to the next target positions Pm8 and Ps8, which is described as "MLLMOVE #1c1#8,#1c2#8".

Step 16 is a command for canceling the cooperative operation of the master robot Ra, which is described as "ALONE".

Step 17 is a command for opening the hand 30 of the master robot Ra, which is described as "OPEN".

Step 18 is a command for making the robot Ra wait until the timer satisfies the state instructed by a variable name of "1002", which is described as "SWAIT 1002".

Step 19 is a command for linearly moving the robot Ra to the target position Pm9 instructed by a variable name of "#1c1#9", which is described as "LMOVE #1c1#9".

Step 20 is a command for moving the robot Ra to the operation end position Pm10, which is described as "HOME".

Next, the program set for the robot Rb will be explained. The program ".PROGRAM slave( )" for the robot Rb is composed of 10 steps and is structured as indicated below so as to execute the operations from a target operation position Ps0 to an operation end position Ps10 via positions Ps1 to Ps9, which are indicated by the dashed lines in FIG. 16, by the slave robot Rb.

Firstly, Step 1 is an operation command for moving the axes of the robot Rb to the target operation position Ps0, which is inputted as "JMOVE #1c1#0". "JMOVE" indicates a command for moving the robot to the designated position in the interpolation operation. "#1c1#0" indicates coordinates of the target operation position Ps0.

Step 2 is a command for moving the robot Rb from the operation start position Ps0 to the next position Ps1, which is described as "JMOVE #1c1#1". "LMOVE" indicates a linear operation command and "#1c1#1" indicates coordinates of the next position Ps1.

Step 3 is a command for closing the hand 30 at the position Ps1 designated at Step 2, which is described as "CLOSE". An independent operation program of the slave robot has been aforementioned.

Step 4 is a command for making the robot Rb wait until the condition instructed by a variable name of "1002" is satisfied, which is described as "SWAIT 1002".

Step 5 is a command for declaring that itself operates as a slave robot, which is described as "SLAVE". When the program is in execution, the slave robot Rb performs the cooperative operation in response to the commands at Steps 5 to 15 from the master robot Ra. During the cooperative operation, as described above, the robot Rb is connected to the robot Ra by the network communication connecting means 21, so that by repairing variations in the control period, both robots can perform the cooperative operation exactly synchronously with each other.

Step 6 is a command for canceling the cooperative operation and declaring return to the independent operation, which is described as "ALONE".

Step 7 is a command for opening the hand 30 of the robot Rb, which is described as "OPEN".

Step 8 is a command for individually setting an instruction for both of the master robot Ra and slave robot Rb, which is described as "SIGNAL 2".

Step 9 is a command for moving the robot Rb to the target position Ps9 instructed by a variable name of "#1c2#9", which is described as "LMOVE #1c2#9".

Step 10 is a command for moving the robot Rb to the operation end position Ps10, which is described as "HOME".

Among a series of operations executed by each robot in this way, at the step of the cooperative operation, the robots are set to the master robot Ra and slave robot Rb, communicate with each other via the communication connecting means, and can perform the cooperative operation synchronously with each other with high precision.

Figure 18:
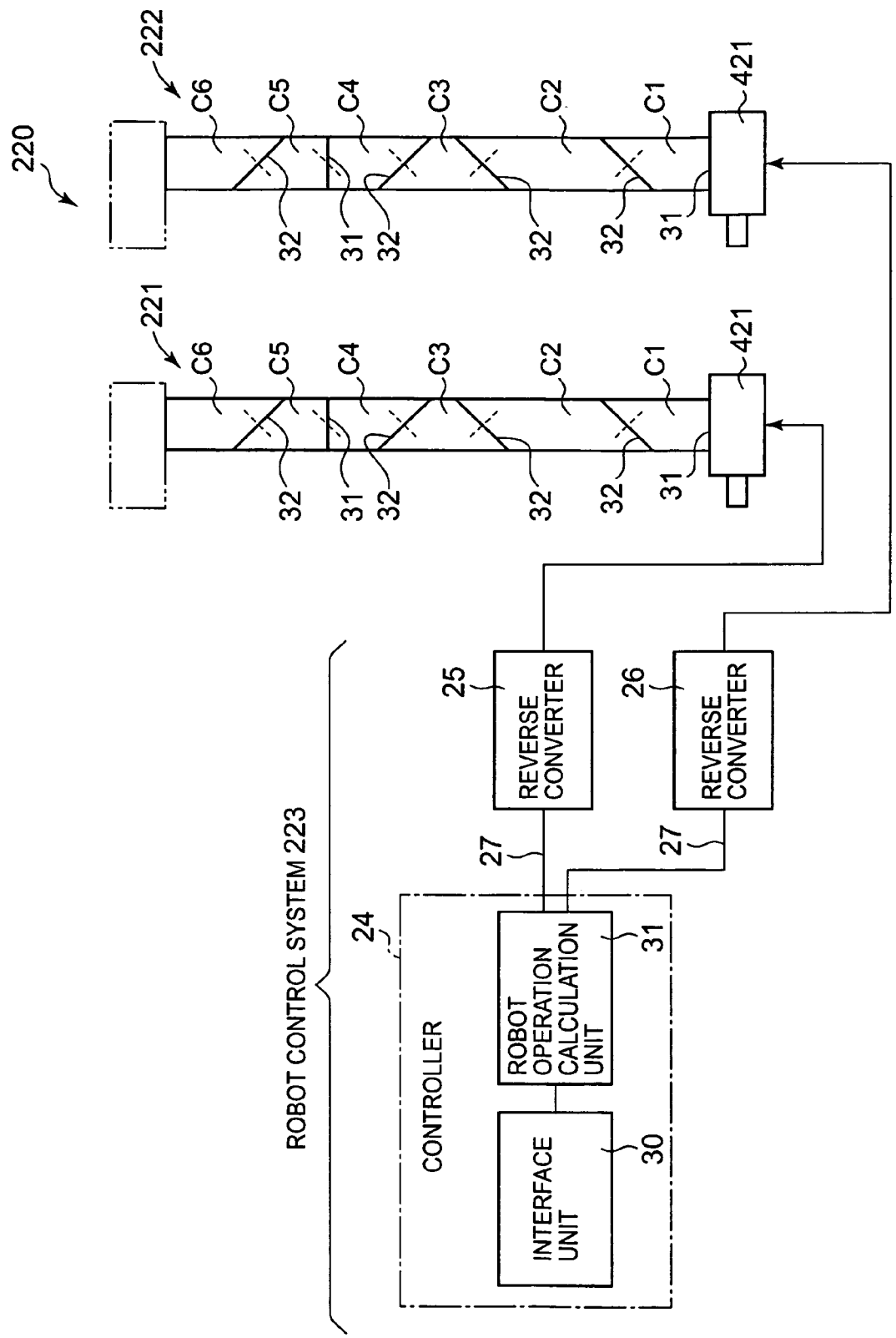
FIG. 18 is a flow diagram showing the constitution of the robot equipment 20 which is the second embodiment of the present invention.

FIG. 18 is a flow diagram showing the constitution of the robot equipment 20 which is the second embodiment of the present invention. Robot equipment 220 which is the second embodiment is only different in the robots to be controlled from the robot equipment 20 of the first embodiment and a robot control system 223 has the same constitution as that of the robot equipment 20 of the first embodiment. Therefore, for the similar constitution, the explanation is omitted and the similar reference numerals are assigned.

A plurality of robots 221 and 222 installed in the robot equipment 220 are composed of a plurality of arm bodies $c_1$ to $c_6$ installed in series, coaxial joints $d_1$, $d_3$, and $d_5$ for connecting coaxially and rotatably two neighboring arm bodies, and inclined joints $d_2$, $d_4$, and $d_6$.

The multi-axial robots 221 and 222 including such coaxial joints and inclined joints rotate a plurality of arm bodies $c_1$ to $c_6$ by the servo motors 45, thereby move them like a snake, and can change the posture and position of the free ends. Therefore, when other devices are complicated and the work route is complicated, or even when the interval between the ceiling and the floor is narrow and work at a low posture is required, the movement and posture of the free ends can be changed suitably. A plurality of arm bodies $c_1$ to $c_6$ are arranged side by side in the series direction. Among them, the first arm body $c_1$ is arranged at one end and the second to sixth arm bodies $c_2$ to $c_6$ are connected sequentially. To the sixth arm body $c_6$, the finger device is connected. The first to sixth arm bodies $c_1$ to $c_6$, as shown in FIG. 15, can be changed so that the respective shaft lines are arranged coaxially and are extended linearly.

The multi-axial robots 221 and 222, since various finger devices, that is, the so-called end effecters are connected to the free ends, and the finger devices are arranged at the target positions and postures, can execute handling, sealing, painting, or arc welding in a small space.

In the first arm body $c_1$, the position end is connected to a predetermined base 421 by the coaxial joint $d_1$. The first arm body $c_1$ is rotatably connected to the base 21 around the rotational shaft line coaxial with the shaft line thereof. Further, to the end of the first arm body $c_1$ on the opposite side of the base 21, the second arm $c_2$ is connected by the inclined joint $d_2$. The inclined joint $d_2$ is rotatably connected around the inclined rotational shaft line inclined at an angle of 450 with the shaft lines of the first arm body $c_1$ and the second arm body $c_2$.

Similarly, the second arm $c_2$ and the third arm $c_3$ are connected by the coaxial joint $d_3$. The third arm $c_3$ and the fourth arm $c_4$ are connected by the inclined joint $d_4$. The fourth arm $c_4$ and the fifth arm $c_5$ are connected by the coaxial joint $d_5$. The fifth arm $c_5$ and the sixth arm $c_6$ are connected by the inclined joint $d_6$. Further, the sixth arm $c_6$ and the finger device may be connected by the coaxial joint.

The respective arm bodies $c_1$ to $c_6$ have the built-in servo motors 45 for rotating the arms. The servo motors 45 transfer the turning force to the arms via a rotation transfer mechanism. The rotation transfer mechanism is, for example, a vibration gear mechanism or a Harmonic Drive (registered trademark). The rotation transfer mechanism has in input side member and an output side member, which mesh with each other and rotate relatively. To one arm body, the input side member is connected and to another arm, the output side member is connected. By doing this, each servo motor 45 transfers power to the input side member, thus another arm body is rotated together with the output side member.

Figure 19:
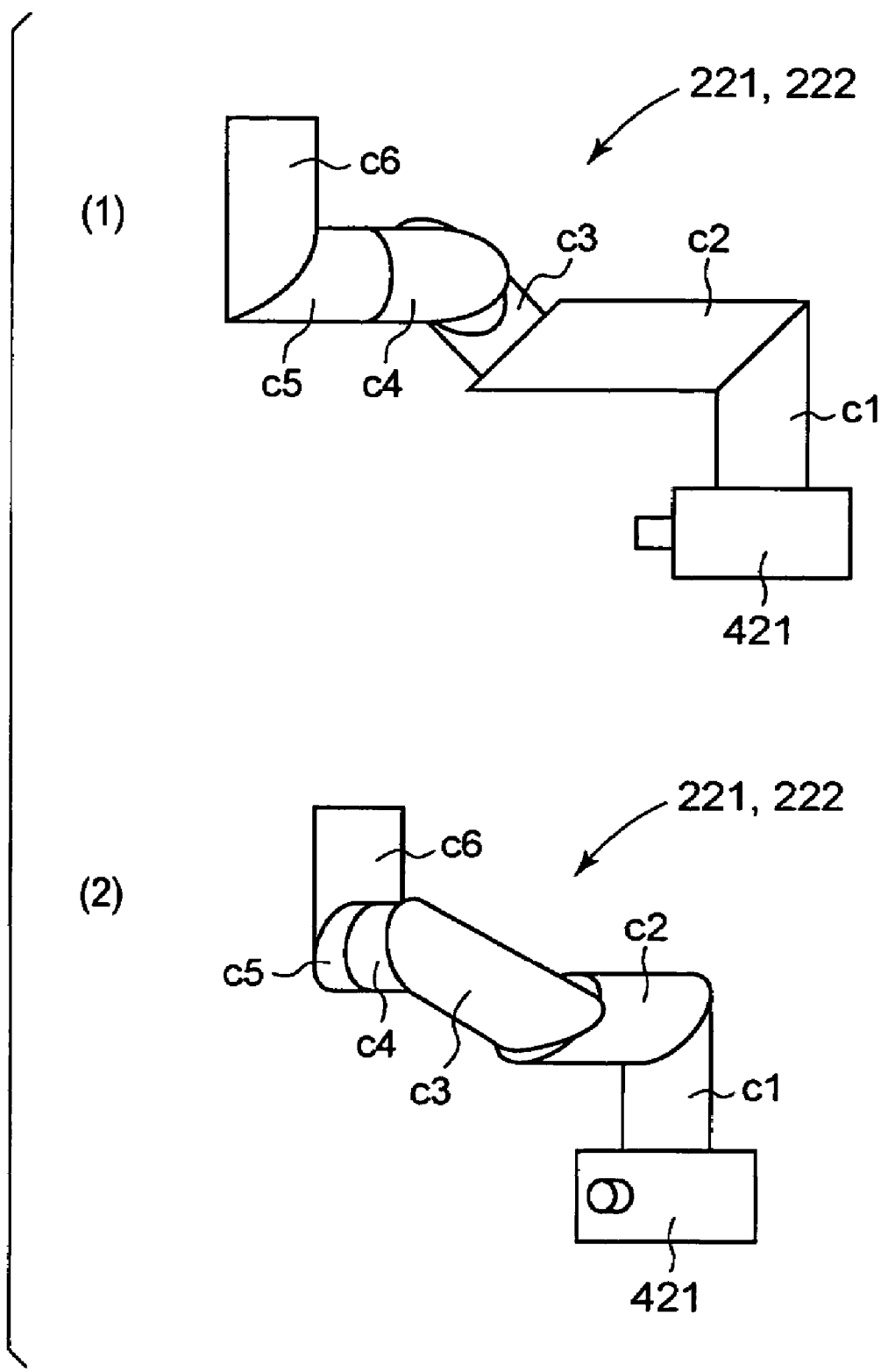
FIG. 19 is perspective views showing the modification conditions of the multi-axial robots 221 and 222.
Figure 20:
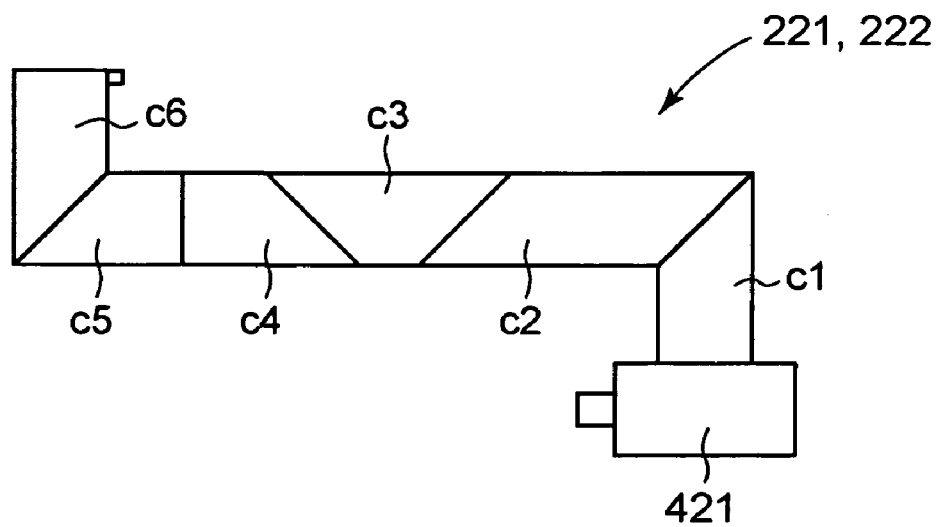
FIG. 20 is a perspective view showing the modification conditions of the multi-axial robots 221 and 222.
Figure 21:
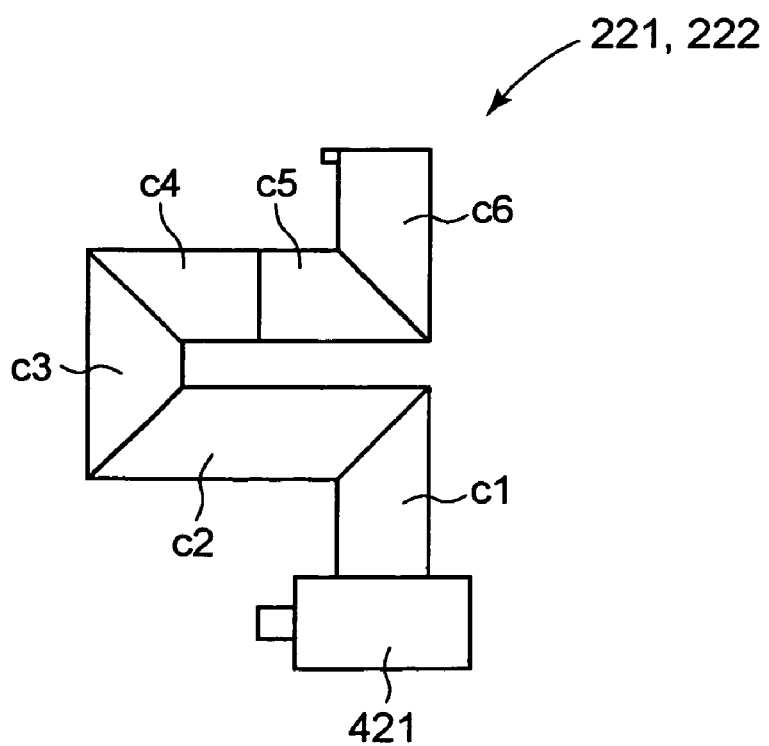
FIG. 21 is a perspective view showing the modification conditions of the multi-axial robots 221 and 222.

FIGS. 19 to 21 are perspective views showing the modified conditions of the multi-axial robots 221 and 222. The viewing direction is different between FIG. 19(1) and FIG. 19(2).

Even if such multi-axial robots are used, by use of the same system 223 as the robot control system 23 indicated in the first embodiment, similar results can be obtained. Namely, a plurality of multi-axial robots can be operated simultaneously and easily. Further, when such multi-joint robots are used, it is often difficult to obtain mathematically uniquely a result of the reverse conversion calculation. In such a case, the result is obtained by a calculation method for performing numerical repetitive calculations and obtaining an optimum reverse calculation result, for example, a convergent calculation method. When using the convergent calculation method, as the convergent count is increased, to perform the reverse conversion, a high calculating capacity is necessary. However, when the third CPU 42 for reverse conversion is installed separately as in the embodiment of the present invention, the control period is shortened and the robots can be operated smoothly. Further, for example, when each robot has seven axes of joints or more, if a plurality of arrangement conditions of each arm for moving each robot hand to one position and posture may be considered, that is, even if the so-called redundant axes are provided, to obtain a result of the revere conversion calculation, a high calculation capacity is necessary. Also in this case, when the third CPU 42 for reverse conversion is installed separately, the control period is shortened and the robots can be operated smoothly.

Figure 22:
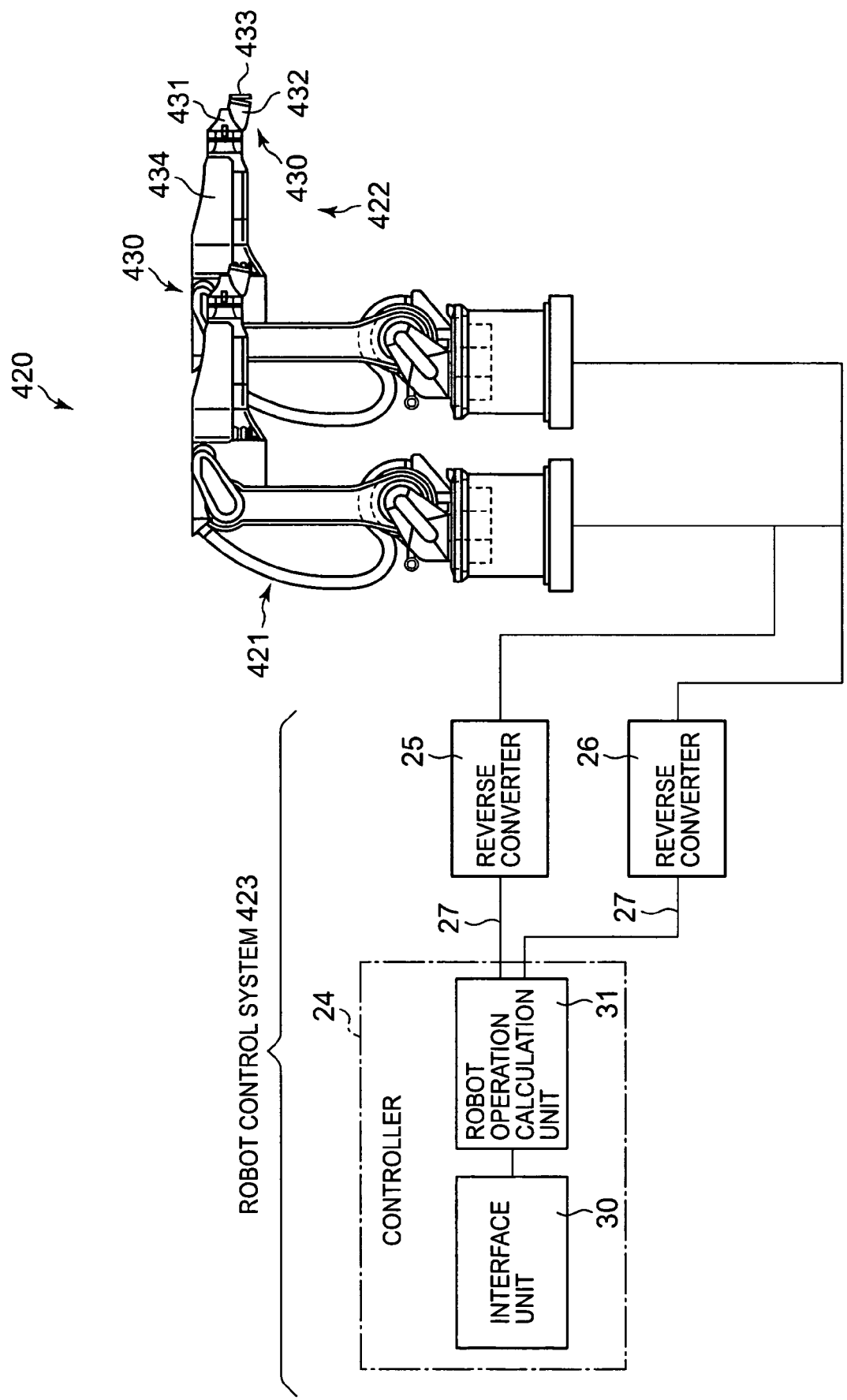
FIG. 22 is a flow diagram showing the constitution of the robot equipment 420 which is the third embodiment of the present invention.

FIG. 22 is a flow diagram showing the constitution of robot equipment 420 which is the third embodiment of the present invention. The robot equipment 420 which is the third embodiment is only different in the robots to be controlled from the robot equipment 20 of the first embodiment and a robot control system 223 has the same constitution as that of the robot equipment 20 of the first embodiment. Therefore, for the similar constitution, the explanation is omitted and the similar reference numerals are assigned.

A plurality of robots 421 and 422 installed in the robot equipment 420 are multi-joint robots equipped with a three-roll wrist 430 and are used, for example, as a painting robot. The three-roll wrist 430 is equipped with a first angular change unit 431 connected to an arm 434 for changing the angle round the preset first shaft line, a second angular change unit 432 connected to the first angular change unit 431 for changing the angle round the second shaft line crossing the first shaft line, and a third angular change unit 433 connected to the second angular change unit 432 for changing the angle round the third shaft line extending in parallel with the first angular change shaft line. When using the robots 421 and 422 as a painting robot, to the third angular change unit 433, a spray gun is connected.

To obtain a result of the reverse conversion calculation by the robots having such a three-roll wrist, it is necessary to perform numerical repetitive calculations and to perform the reverse conversion, a high calculation capacity is necessary. When the third CPU 42 for reverse conversion is installed separately like the present invention, the robots can be operated smoothly.

Figure 23:
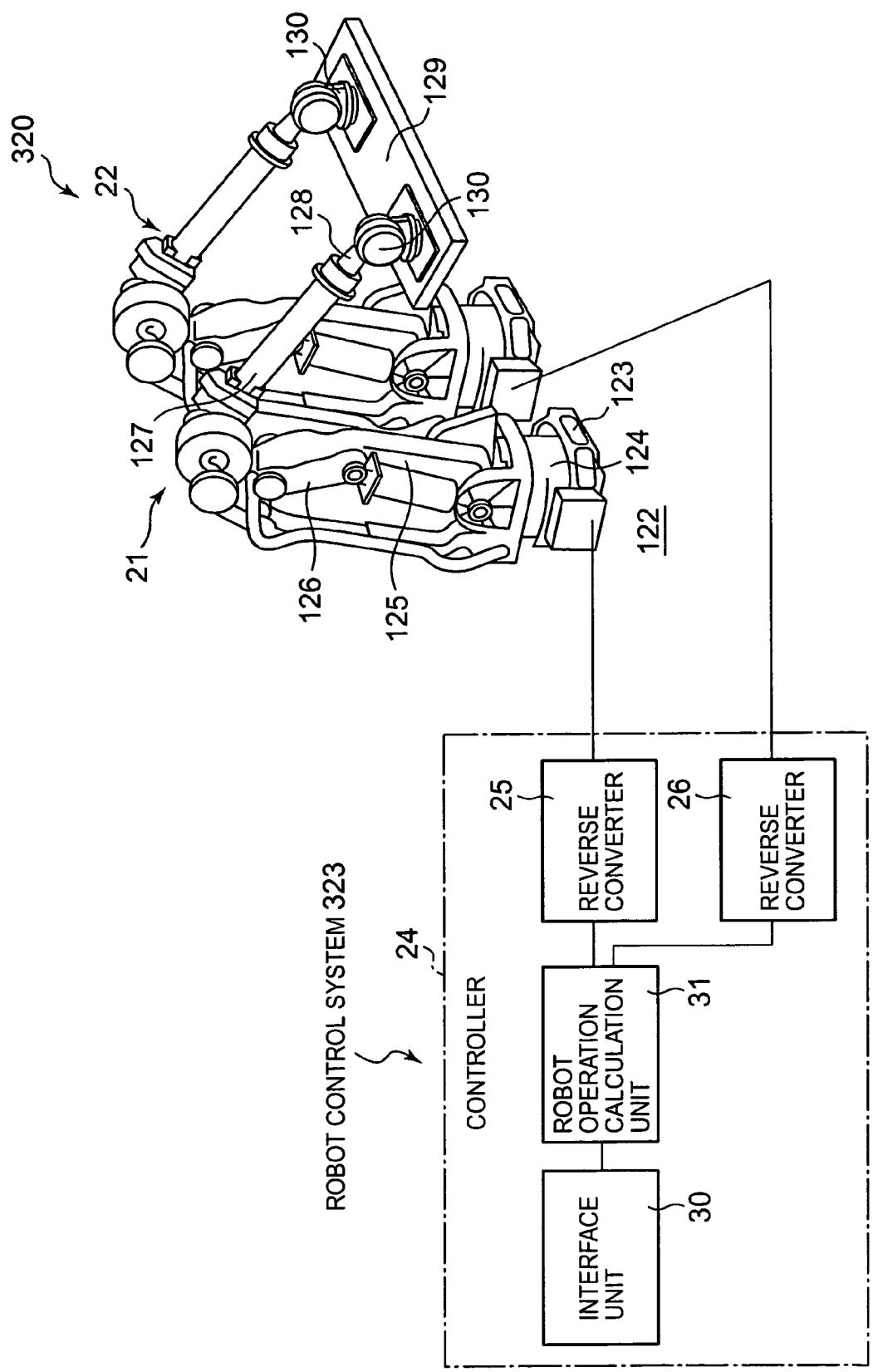
FIG. 23 is a flow diagram showing the constitution of the robot equipment 320 which is the fourth embodiment of the present invention.
Figure 24:
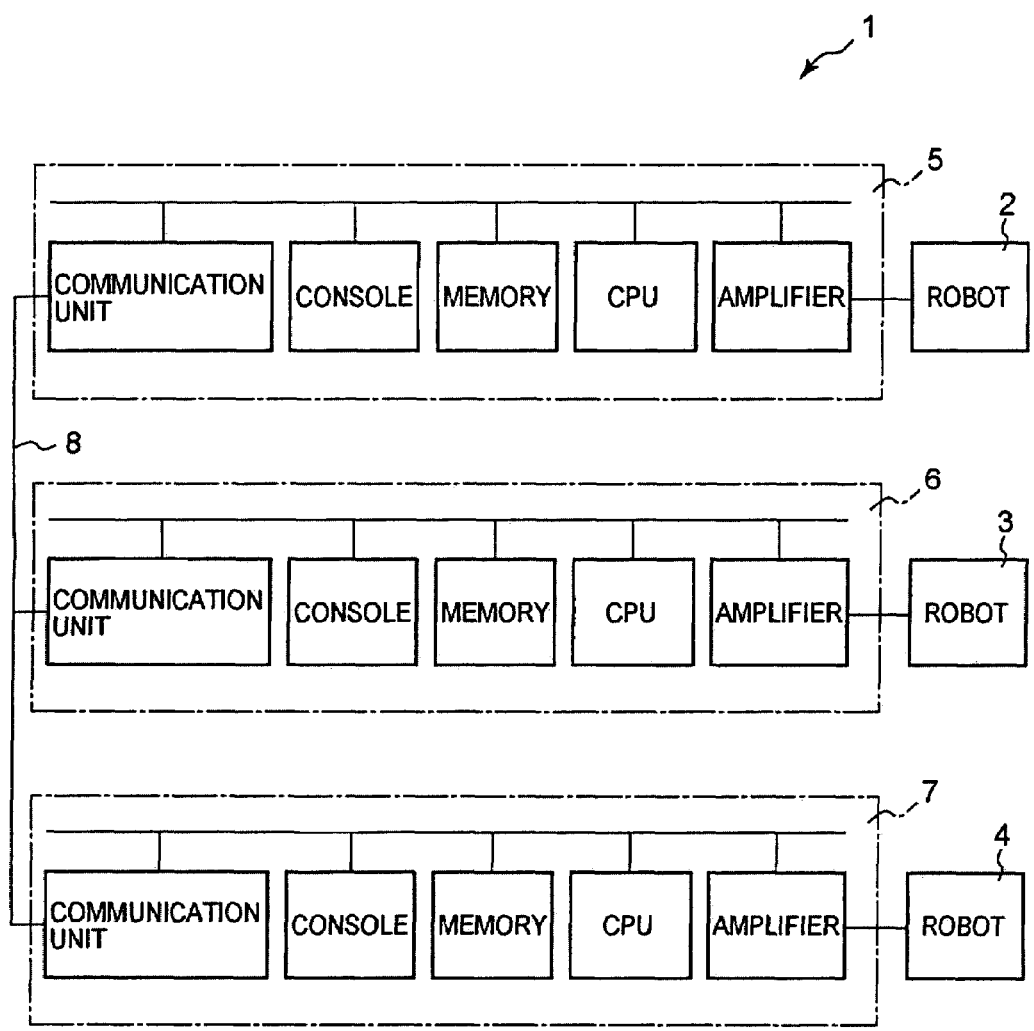
FIG. 24 is a block diagram showing the robot equipment 1 of the first conventional art.
Figure 25:
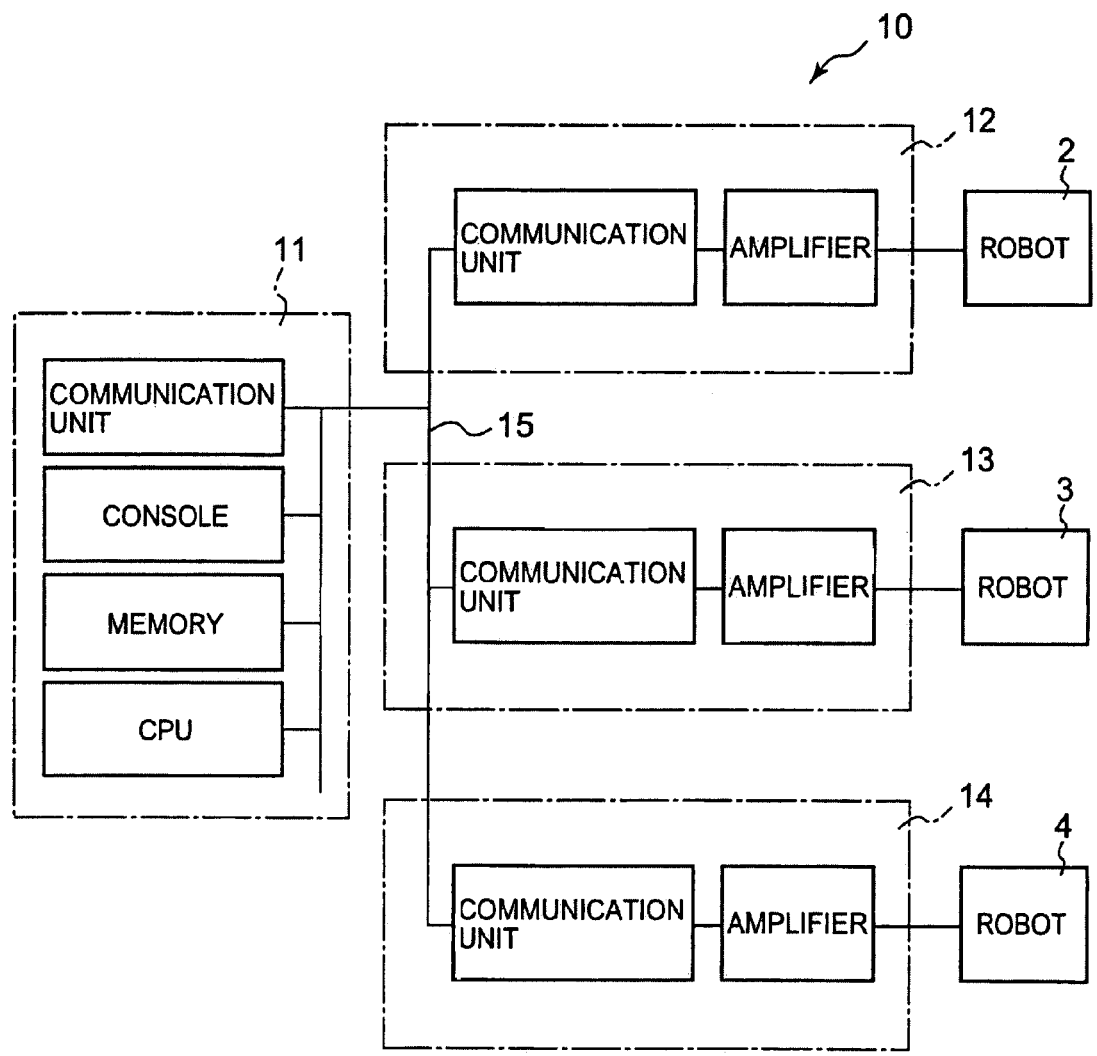
FIG. 25 is a block diagram showing the robot equipment 10 of the second conventional art.

FIG. 23 is a flow diagram showing the constitution of robot equipment 320 which is the fourth embodiment of the present invention. In the robot equipment 320 which is the fourth embodiment, the reverse converter 25 is included in each controller 24 unlike the robot equipment of the first embodiment. Namely, the robot operation calculation unit 31 and the reverse converters 25 and 26 are connected by a bus line. As mentioned above, the present invention includes a case that the third CPU 42 for reverse conversion is installed in the controller. Further, the robot equipment 320 of the fourth embodiment is not limited to the robot kind and may simultaneously control a plurality of multi-axial robots shown in FIGS. 18 and 22. Also in the robot equipment 320 of the fourth embodiment, the same results as those of the first embodiment can be obtained.

The embodiments of the present invention as mentioned above are just illustrations of the invention and the constitution of the present invention can be modified within the scope of the present invention. For example, as a robot to be controlled, the vertical multi-joint robot, the multi-axial robot having an inclined joint axis shown in FIG. 18, and the multi-joint robot having a three-roll wrist shown in FIG. 22 are illustrated, though any robot requiring the reverse conversion is acceptable. For example, a rectangular coordinate type or a polar coordinate type multi-joint robot may be used. Further, in this embodiment, a case that two robots are controlled simultaneously is explained, though three or more robots, for example eight robots may be controlled simultaneously. Further, different kinds of robots may be controlled simultaneously.

Further, as a finger device, the robot hand 130 is operated. However, in addition to the robot hand 130, for example, another finger device such as a welding device or a painting device may be installed at the free end of a robot and the finger device may be operated and moved. For example, when welding a workpiece, by simultaneously operating a workpiece holding robot for holding the workpiece and changing the position and posture of a welding torch and a tool holding robot for holding the welding torch and changing the position and posture of the welding torch, the welding operation may be performed. Even when performing such a cooperative operation by a plurality of robots, the robot control system 23 of the present invention can be used. By use of the robot control system 23 of the present invention, the robots can smoothly perform the cooperative operation and the welding operation can be performed for a workpiece in an complicated shape.

Further, as an actuator for operating the robots, the servo motors 45 are used, though other actuators may be used. Further, the first CPU 32 and the second CPU 39 may be realized by one CPU.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A robot control system for simultaneously controlling a plurality of multi-axial robots, each of said robots having a plurality of actuators, a standard movement part being set in each of said robots, comprising:

a single main controller configured to calculate respective movement positions of said standard moving part on a movement route along which said standard moving part is to be moved; and a plurality of sub-controllers installed for each of said robots, each of said sub-controllers being configured to calculate an operation amount of each of said actuators so that said standard moving part of a corresponding robot is to be moved along said movement route, based on said movement positions of said standard moving part of said corresponding robot on said movement route, and control each of said actuators of said robots in accordance with said operation amount.

2. A robot control system according to claim 1, wherein: said main controller includes:

an input-output unit configured to perform an input-output operation of a signal with an external device;

an input-output control circuit configured to control said input-output operation of said signal in said input-output unit;

a storage unit configured to store an operation plan for obtaining said movement positions of said standard moving part of each of said robots; and a movement route calculation circuit installed separately from said input-output control circuit, said movement route calculation circuit being configured to calculate said respective movement positions of said standard moving part of each of said robots on said movement route along which said standard moving part is to be moved, based on said operation plan.

3. A robot control system according to claim 1, wherein: said main controller has a maximum connection count corresponding to a maximum number of said sub-controllers which can be connected to said main controller, when sub-controllers of said maximum connection count are connected, said main controller gives calculation results to said sub-controllers sequentially at a preset timing, and when sub-controllers of smaller than said maximum connection count are connected, said main controller gives said calculation results to said sub-controllers sequentially at a same timing as said timing when said sub-controllers of said maximum connection count are connected.

4. A robot control system according to claim 1, wherein: said main controller includes:

a storage unit configured to store an operation plan for obtaining said movement positions of said standard moving part of each of said robots; and a movement route calculation circuit configured to calculate said movement positions of said standard moving part of each of said robots on said movement route along with said standard moving part is to be moved, based on said operation plan, said operation plan includes a cooperative operation information and a linked operation relating information, said cooperative operation information indicating which is a marked robot, a master robot for performing a preset standard operation or a slave robot for operating in link motion with a corresponding master robot, said linked operation relating information indicating a linked operation relation for an operation of said corresponding master robot when said marked robot is said slave robot, said movement route calculation circuit, when calculating said movement positions on said movement route along which said standard moving part of said slave robot moves, calculates said movement positions on said movement route along which said standard moving part of said slave robot moves, based on movement positions of said corresponding master robot and said link operation relating information.

5. A robot control system according to claim 1, wherein:
said main controller and said sub-controllers are arranged at positions away from each other, and
a plurality of communication cables for respectively connecting said main controller and said sub-controllers are installed.

6. A robot control system according to claim 5, wherein said main controller and each of said sub-controllers are installed so as to communicate with each other using Ethernet.

7. A robot equipment comprising:
a robot control system as defined in claim 1; and
a plurality of robots configured to be directly controlled by said robot control system.

* * * * *